US012300041B2

(12) United States Patent
Mesde et al.

(10) Patent No.: US 12,300,041 B2
(45) Date of Patent: May 13, 2025

(54) VEHICLE DATA STREAM SUBSCRIPTION SYSTEM

(71) Applicant: Amazon Technologies, Inc., Seattle, WA (US)

(72) Inventors: Roland Mesde, Cupertino, CA (US); Alex Bessonov, San Jose, CA (US); Nitin Giri, Bothell, WA (US); Kyle Daniel Halbach, Berlin, WA (US); Roie Hodara, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 383 days.

(21) Appl. No.: 17/806,434

(22) Filed: Jun. 10, 2022

(65) Prior Publication Data

US 2024/0096139 A1    Mar. 21, 2024

(51) Int. Cl.
*G06Q 30/02*   (2023.01)
*G06F 16/21*   (2019.01)
*G06F 16/28*   (2019.01)
*G06V 20/58*   (2022.01)
*G07C 5/00*    (2006.01)

(52) U.S. Cl.
CPC ............ *G07C 5/008* (2013.01); *G06F 16/211* (2019.01); *G06F 16/283* (2019.01); *G06V 20/58* (2022.01)

(58) Field of Classification Search
CPC ..... G07C 5/008; G06F 16/211; G06F 16/283; G06V 20/58; G06Q 50/40; G06Q 30/0201; G06Q 30/0254; G06Q 10/067; G06Q 30/0246
See application file for complete search history.

(56) References Cited

U.S. PATENT DOCUMENTS 7,177,859 B2    2/2007 Pather
10,160,456 B2 * 12/2018 Jun .......................... A61B 5/18
(Continued)

FOREIGN PATENT DOCUMENTS

KR    2021-0060634 A  *  5/2021  ............. G01S 19/14

OTHER PUBLICATIONS

Y. Du; M. Chowdhury; M. Rahman; K. Dey; A. Apon; A. Luckow; L.B. Ngo, A Distributed Message Delivery Infrastructure for Connected Vehicle Technology Applications(English), IEEE Trans on Intelligent Trans Systems (vol. 19, Issue: 3, 2018, pp. 787-801), Jun. 2, 2017 (Year: 2017).*

(Continued)

*Primary Examiner* — Marilyn G Macasiano
(74) *Attorney, Agent, or Firm* — Alexander A. Knapp; Kowert, Hood, Munyon, Rankin & Goetzel, P.C.

(57) ABSTRACT

A vehicle data streaming service provides a curated catalog of vehicle attributes and allows a vehicle data stream source to register to the vehicle data streaming system and associate its data stream to a vehicle attribute of the attribute catalog. The vehicle data streaming service also allows vehicle data stream destinations to subscribe to the vehicle attribute in the vehicle catalog, receives streamed vehicle data from the data stream source, and sends streamed vehicle data conforming to registration requirements to the data stream destinations. Additionally, the vehicle data streaming service may allow management of the vehicle attribute catalog and may further manage the registration one or more sources and the subscriptions of one or more destinations.

20 Claims, 15 Drawing Sheets

(56) References Cited

U.S. PATENT DOCUMENTS

| | | |
|---|---|---|
| 11,924,210 B2 | 3/2024 | Zhang |
| 2008/0164997 A1 | 7/2008 | Aritsuka |
| 2008/0178143 A1 | 7/2008 | Dougan |
| 2014/0280177 A1* | 9/2014 | Ishii ............... G06F 16/285 707/740 |
| 2016/0050269 A1 | 2/2016 | Botticelli |
| 2016/0241676 A1 | 8/2016 | Armstrong |
| 2017/0011129 A1 | 1/2017 | Matsumoto |
| 2017/0026858 A1 | 1/2017 | McKee |
| 2017/0138625 A1 | 5/2017 | Shiratori |
| 2018/0183873 A1 | 6/2018 | Wang |
| 2019/0036830 A1 | 1/2019 | Yamato |
| 2019/0280944 A1 | 9/2019 | Bellini |
| 2020/0007663 A1 | 1/2020 | Abilay |
| 2020/0036774 A1 | 1/2020 | Tada |
| 2020/0151611 A1 | 5/2020 | McGavran |
| 2020/0364953 A1* | 11/2020 | Simoudis ............... G06N 20/00 |
| 2021/0035124 A1 | 2/2021 | Morton |
| 2022/0232010 A1 | 7/2022 | Zhang |
| 2022/0383019 A1 | 12/2022 | Tremblay |
| 2023/0008976 A1 | 1/2023 | Xu |
| 2023/0205670 A1 | 6/2023 | Cardoso |
| 2023/0377383 A1 | 11/2023 | Makita |

OTHER PUBLICATIONS

U.S. Appl. No. 17/809,868, filed Jun. 29, 2022, Roland Mesde, et al.
U.S. Appl. No. 17/809,878, filed Jun. 29, 2022, Roland Mesde, et al.
U.S. Appl. No. 17/810,301, filed Jun. 30, 2022, Roland Mesde, et al.
International Search Report and Written Opinion mailed Oct. 5, 2023 in PCT/US2023/068234, Amazon Technologies Inc., pp. 1-11.
U.S. Appl. No. 17/710,585, filed Mar. 31, 2022, Roland Mesde, et al.
U.S. Appl. No. 17/710,634, filed Mar. 31, 2022, Roland Mesde, et al.
U.S. Appl. No. 17/710,644, filed Mar. 31, 2022, Roland Mesde, et al.
U.S. Appl. No. 17/710,551, filed Mar. 31, 2022, Roland Mesde, et al.

* cited by examiner

VEHICLE DATA STREAM SUBSCRIPTION SYSTEM

BACKGROUND

Modern vehicles, such as cars, trucks, motorcycles, etc. are often manufactured with electronic sensors and include computer systems programmed with control algorithms that take inputs from such electronic sensors to determine various control actions for the vehicle (or systems implemented in the vehicle). These modern vehicles are equipped with an increasing variety of sensors that generate various types and quantities of data that often exceed that produced by previous vehicles. Such data generated from various sensors may be stored or transmitted for use by various users, such as downstream applications or data analytics. However, connecting and coordinating distribution of data streams from multiple data sources, such as vehicle sensors, to multiple destinations poses a non-trivial challenge.

Figure 1:
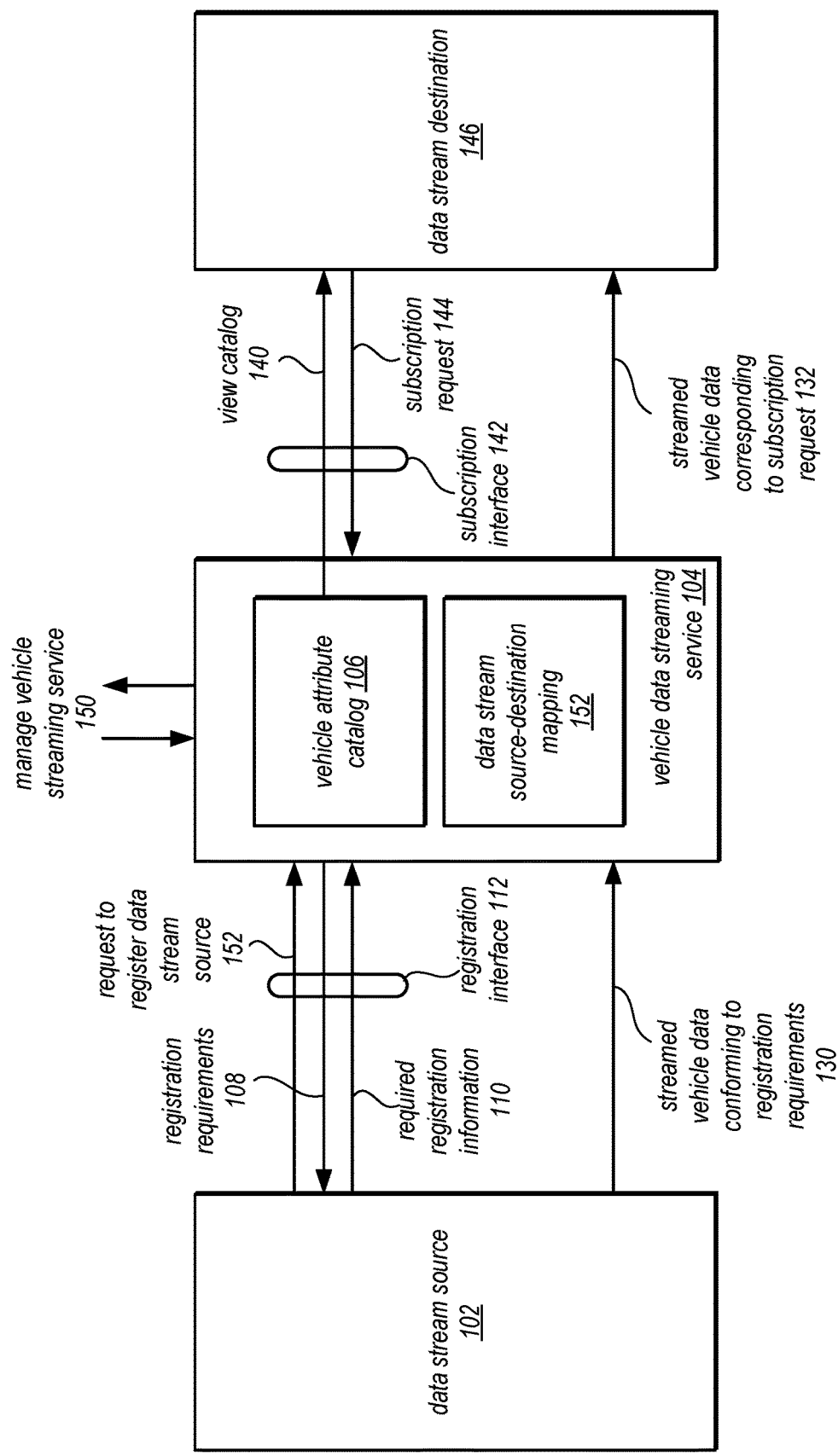
FIG. 1 illustrates a vehicle data streaming service that provides a curated catalog of vehicle attributes, allows a vehicle data stream source to register a data stream to be associated with a vehicle attribute included, or to be included, in the catalog, and, in response to a successful registration, associates the data stream to the vehicle attribute of the catalog. The vehicle data streaming service also allows a vehicle data stream destination to subscribe to a vehicle attribute included in the catalog. The vehicle data streaming service furthermore receives streamed vehicle data from the data stream source and sends streamed vehicle data conforming to registration requirements to the data stream destination. Additionally, the vehicle data streaming service manages the vehicle attribute catalog and manages the registration/subscription of the one or more sources/destinations (and associated mappings), according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a vehicle data streaming service for managing vehicle data provided by multiple vehicle data stream sources and received at multiple data stream destinations.

One trend in the automotive industry is an increased focus on the concept of connected vehicles equipped with electronic sensors which are utilized for various applications—from increasing fuel efficiency of a vehicle to enhancing greater degrees of automation using artificial intelligence (AI). Vehicles are generating exponentially more data with each new generation of vehicles and are not only beginning to be differentiated between each other mechanically but increasingly differentiated by software. As vehicles become more advanced and rely on a greater number of sensors that generate large amounts of data, the opportunity to use such sensor data to improve vehicle performance has also grown. For example, for a given set of data streams generated from a vehicle, there may be a multitude of specialized data stream providers respectively managing respective portions of the vehicle sensor data. Furthermore, there may be a multitude of data stream destinations respectively interested in receiving portions of the vehicle data. For example, some destinations may only be interested in receiving a selected portion of vehicle data generated by a vehicle, such as one or more selected vehicle data streams pertinent to analysis to be performed using the streamed vehicle data. Sending all available data from a vehicle may not only create unnecessary network load involved in the transfer of the large amount of data, but may also create inefficiencies in requiring the destination to filter out irrelevant vehicle data. Thus, a vehicle data streaming service that connects vehicle data stream sources to particular vehicle attributes and allows vehicle data stream consumers to select to receive vehicle data only for selected vehicle attributes improves data sharing by reducing the transmission and filtering of unwanted vehicle data. Also, the vehicle data streaming service provides a mechanism for advertisement of available vehicle attributes to potential vehicle data consumers and a mechanism to seamlessly connect vehicle data stream sources and vehicle data stream destinations in a simple way. For example, the vehicle data streaming service may manage mappings and connections, such that a subscriber to a vehicle data stream for a selected attribute may simply provide a destination address at which subscribed streaming vehicle data for the selected attribute is to be delivered and the vehicle data streaming service may take care of routing the streaming vehicle data from the vehicle data source to the destination and/or performing any necessary transformations to the streaming vehicle data such that the streaming vehicle data conforms to a schema of the vehicle data streaming service and such that the streaming vehicle data is delivered to the destination in a standardized format.

For example, in addition to the fact that there may be a plurality of data stream sources and destinations, a manager of an individual destination may not be aware of all of the data stream sources that are available to be subscribed to. And, even if a manager of a given data stream destination is aware of the data stream source, it may be interested in receiving streaming data from, the process of creating a data stream, including whether the data stream destination has valid access credentials may further require coordination between data stream destination managers and data stream source managers. Additionally, there may be issues around standardization and interoperability of vehicle data as the vehicle data from various data stream sources may furthermore be configured to different vehicle schemas and may need to be modified to be able to be used by the data stream destination. Thus, in some embodiments, a vehicle data streaming service may be used to facilitate the transfer of vehicle data between data stream sources and data stream destinations to address these issues.

For example, in some embodiments, a vehicle data streaming service may facilitate the movement of vehicle data from various sources by providing a curated catalog of vehicle attributes and allowing vehicle data stream sources to register and associate their data streams to vehicle attributes of the catalog. The vehicle data streaming service may allow vehicle data stream destinations to subscribe to vehicle attributes in the vehicle catalog. For example, the vehicle data streaming service may obtain streamed vehicle data from the vehicle data stream source and may send the received streamed data to vehicle data stream destinations. The vehicle data streaming service may further provide governance of the registration/subscription process and enforce data schema requirements and access requirements. Additionally, the vehicle data streaming service may manage the vehicle attribute catalog and aid in discovery of pertinent vehicle attributes.

FIG. 1 illustrates a vehicle data streaming service that provides a curated catalog of vehicle attributes, allows a vehicle data stream source to register a data stream in the data streaming service, and, in response to a successful registration, associates the data stream to a vehicle attribute of the catalog. The vehicle data streaming service also allows a vehicle data stream destination to subscribe to a vehicle attribute in the catalog. The vehicle data streaming service furthermore receives streamed vehicle data from the data stream source, and sends streamed vehicle data, conforming to registration requirements to the data stream destination, to the data stream destination. Additionally, the vehicle data streaming service manages the vehicle attribute catalog and manages the registration/subscription of the one or more sources/destinations, according to some embodiments.

In FIG. 1, a vehicle data streaming service 104 includes vehicle attribute catalog 106 and a data stream source-destination mapping 152. The vehicle data streaming service 104 may allow one or more users to manage the vehicle streaming service 150 through an interface, wherein the one or more users may be able to configure the vehicle data streaming service 104. The vehicle data streaming service 104 may allow managing the vehicle attribute catalog 106, changing one or more governance policies of the vehicle data streaming service 104, etc. In some embodiments, the vehicle data streaming service 104 may allow one or more users to create, update, or delete vehicle attributes as well as one or more pieces of associated metadata. The management of vehicle streaming service will be further described in FIG. 5.

As an example, in some embodiments, the vehicle data streaming service 104 may receive a request to register data stream source 152 from a data stream source 102. In some embodiments, the request to register the data stream source 152 may further include a request for a vehicle data stream source to be recognized as a vehicle data stream source by the vehicle data streaming service 104, and additionally provide required information to establish a streaming relationship wherein the vehicle data streaming service 104 may be an endpoint of a data pipeline from the vehicle data stream source (wherein the vehicle data streaming service further provides streamed vehicle data provided to the endpoint to vehicle data consumers). In some embodiments, the request to register data stream source 152 may include one or more access credentials required to be recognized as a legitimate data stream source by the vehicle data streaming service 104. In some embodiments, the vehicle data streaming service 104 may send registration requirements to the data stream source to complete the registration. The registration requirements may include a source infrastructure identity information, a required configuration to conform message schema for the data source, a vehicle attribute to associate to the source, and/or a mapping required to configure the vehicle data schema. The data stream source may further submit the required registration information 110 according to the registration requirements 108 to complete the registration of the data stream source and to effectuate association of the data stream source with one or more vehicle attributes of the vehicle attribute catalog 106. The various registration interactions may occur through a registration interface 112 of the vehicle data streaming service 104. In some embodiments, the registration request may require approval by the vehicle data streaming service 104. In some embodiments, the registration request may require approval obtained as part of interactions involving the management of the vehicle streaming service 150. Once the registration request is approved a streamed vehicle data stream conforming to the registration requirements 130 may be sent to the vehicle data streaming service 104. The registration workflow and interaction between the data stream source 102 and the vehicle data streaming service 104 will be described further in FIG. 2.

In some embodiments, one or more data stream destinations 146 may view the vehicle attribute catalog 140 to discover attributes available in the vehicle attribute catalog that correspond to data of interest to be received at the data stream destinations. The data stream destination 146 may send a subscription request 144 to receive data associated to the discovered vehicle attribute of interest. The subscription request 144 and a request to view the catalog 140 may be performed through the subscription interface 142 of the vehicle data streaming service 104. As further discussed in FIG. 3, in some embodiments a data stream destination and an entity issuing a request to subscribe to a data stream at the data stream destination may be the same entity or different entities. Upon a successful subscription request, the data stream source-destination mapping 152 may create a mapping between the streamed vehicle data conforming to registration requirements 130 and the data stream destination 146. The vehicle data streaming service 104 may send a streamed vehicle data stream corresponding to the subscription request 132 to the data stream destination 146. In some embodiments, the streamed vehicle data corresponding to the subscription request 132 may be modified to conform to the schema of the data stream destination 146. The subscription workflow and interactions between the data stream source 102 and the vehicle data streaming service 104 will be described further in FIGS. 3 and 4A-4C. Furthermore, the data stream destination 146 may be any number of downstream services/applications. In some embodiments, the data stream destination 146 may be a vehicle shadow that allows interaction between a virtual representation of a connected vehicle to a user. In some embodiments, the data stream destination 146 may be a data analytics service, a data lake that provides a repository of vehicle data, and/or other data storage services.

Although FIG. 1 depicts only one data stream source 102, any number of data sources may send vehicle information to the vehicle data streaming service 104. The vehicle data streaming service 104 may, in various embodiments, be an apparatus or system for managing the distribution, storage, retrieval, and/or processing of large-scale vehicle data streams. The vehicle data streaming service 104 may be designed to handle hundreds or even thousands of concurrent data sources and destinations. The term "data stream", as used herein, refers to a sequence of vehicle data records that may be generated by one or more data sources (e.g., vehicle sensors) or producers (e.g., vehicle, vehicle service center) and accessed by one or more vehicle data consumers at one or more destinations.

Please note that the previous description of a vehicle data streaming service 104 is a logical illustration and thus is not to be construed as being limited to a specific implementation of network addresses, system interfaces, or various other features. In some embodiments, various other registration flow steps may be used to associate a vehicle data stream from the data stream source 102 to a vehicle attribute of the vehicle attribute catalog 106. Different combinations or implementations may be implemented in various embodiments.

This specification continues with various examples of a vehicle data streaming service including different components/modules, or arrangements of components/module that may be employed as part of implementing the vehicle data streaming service. A number of different methods and techniques to implement various methods of registration of vehicle data stream sources, subscription of vehicle data stream destinations, and management of the vehicle data streaming service (including the vehicle attribute catalog) are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
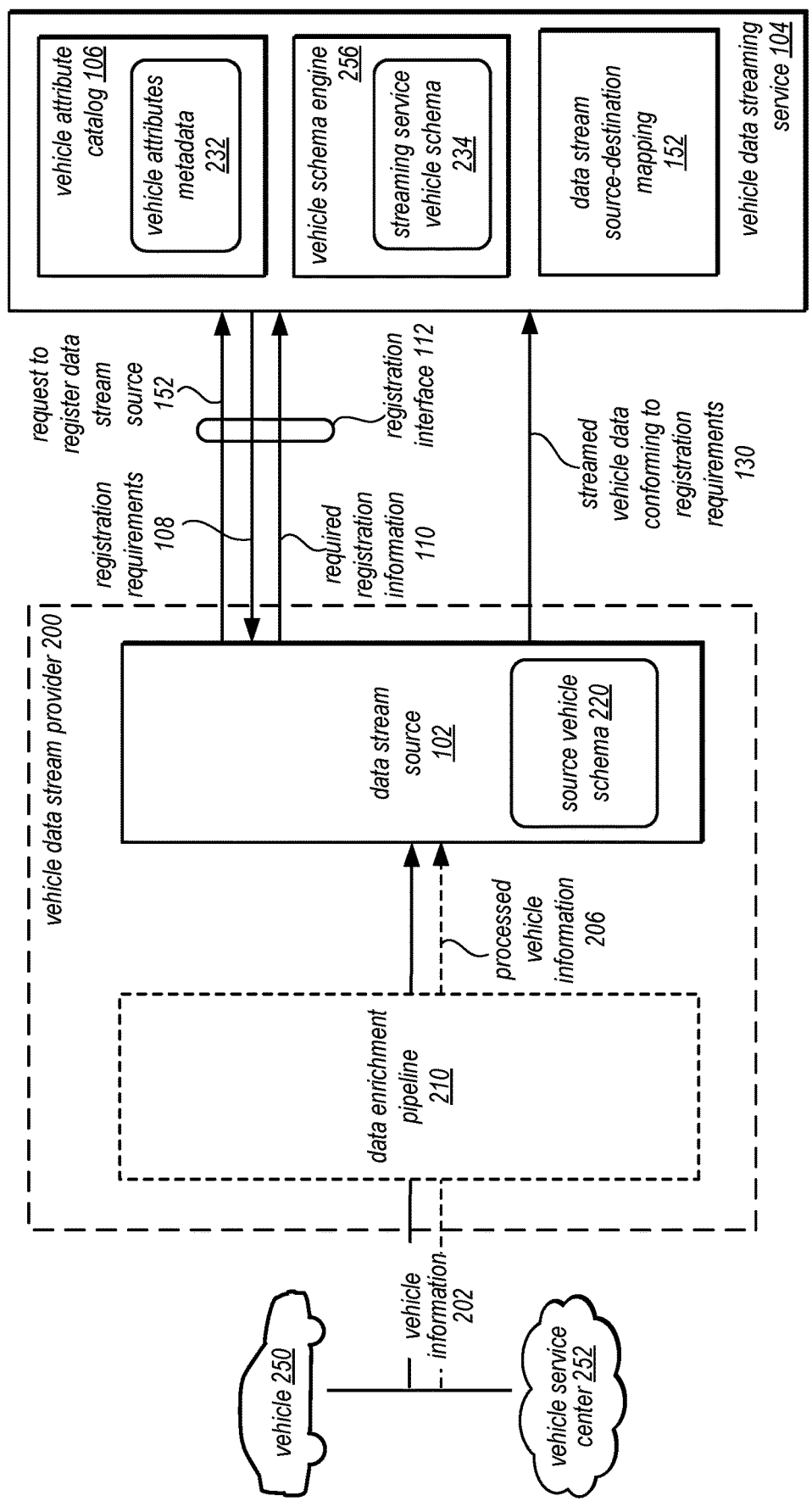
FIG. 2 illustrates a more detailed view of the vehicle data streaming service and registration flow of a data stream source of a vehicle data stream provider to a vehicle attribute, including flow of vehicle data from a vehicle and formatting of the vehicle data to conform to a streaming service vehicle schema, according to some embodiments.

FIG. 2 illustrates a more detailed view of the vehicle data streaming service and registration of a data stream source of a vehicle data stream provider, wherein the data stream source is registered to a vehicle attribute included, or to be included, in a catalog of the vehicle data streaming service. For example, the vehicle data streaming service may manage the flow of vehicle data from a vehicle and further manage formatting of the vehicle data, such that the vehicle data is modified to conform to a streaming service vehicle schema, according to some embodiments.

In FIG. 2, a vehicle 250 and vehicle service center 260 may send vehicle information 202 to the data stream source 102. In some embodiments, a vehicle 250 may generate one or more pieces of vehicle information 202 to send to the data stream source 102. The vehicle 250 may send the vehicle information 202 containing data such as video frames, images, radar amplitude, temperature data, engine speed, and any other information about the vehicle 250 generated from one or more sensors. In some embodiments, the vehicle information 202 may include Global Positioning System (GPS) information determined using cellular, wireless passive, satellite, and other types of GPS systems and may be used to determine the jurisdiction of the vehicle 250. In some embodiments, a geographic location of a vehicle 250 may be determined in a variety of manners.

In some embodiments, the vehicle information 202 may include aspects that may be considered to be personally identifiable information ("PII"). PII may include any information that may be linked to or linkable to a certain individual and may furthermore be categorized by "PII levels" or degrees to which the vehicle information 202 may be used to personally identify individuals. In order to protect the privacy of individuals, the vehicle data streaming service may provide higher protections for vehicle data that includes aspects that may be PII. For example, greater access credentials may be required to access or subscribe to vehicle attributes comprising such vehicle data streams.

In some embodiments, vehicle data may be supplied by the vehicle service center 252. Moreover, in some embodiments, the vehicle service center 252 may provide information such as vehicle data pertaining to repairs and/or vehicle registration. The vehicle 250 or vehicle service center 252 may send the vehicle information 202 using various publish-subscribe network protocols or other network protocols to transports messages. For example, the vehicle 250 may send the vehicle information 202 using an MQ (e.g., Message Queue) Telemetry Transport ("MQTT") protocol. Although FIG. 2 depicts only the vehicle 250 and the vehicle service center 252 as generating the vehicle information 202, any number of vehicle data generators (e.g., vehicles, vehicle service centers, etc.) may send vehicle information 202 to the data stream source 102.

In some embodiments, the data stream source 102 may be part of a vehicle data stream provider 200 that manages one or more vehicle data streams. The vehicle data stream provider 200 may further comprise a data enrichment pipeline 210 that processes the vehicle information 202 to generate additional vehicle data of interest, and/or to enhance the vehicle information 202. For example, the data enrichment pipeline may comprise one or more compute services that provide instances, containers, and/or functions according to various configurations for data processing operations designated by the vehicle data stream provider 200. The virtual compute instance of a data enrichment pipeline 210 may, for example, comprise one or more servers and/or virtualized computing resources. A container may provide a virtual operation system or other operating environment for executing or implementing applications to process the vehicle information 202. In some embodiments, an ephemeral computing function may be implemented for the pre-processing the vehicle information 202 as one or more vehicle data processing operations are performed, which may be automatically scaled up or down to provide an appropriate number of computing resources to perform a given set of pre-processing tasks. Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing data processing of the vehicle information 202.

Furthermore, in various embodiments, the compute instance configurations for the data enrichment pipeline 210 may also include compute instances, containers, and/or functions with a general or specific purpose, such as computational workloads for compute intensive applications. In some embodiments, the compute instance may be used for machine learning applications such as applications that train and generate a machine learning regression model to process and derive additional vehicle information 202. The size of compute instances, containers, and/or functions, such as a particular number of virtual CPU cores, memory, cache, storage, as well as any other performance characteristic may vary based on the specific application. The data enrichment pipeline 210 may send processed vehicle information 206 to the data stream source 102.

As described in FIG. 1, the data stream source 102 may request to register a data stream source 152 to the vehicle data streaming service 104. In some embodiments, the request to register the data stream source 152 may further include a request for a data stream of the data stream source 102 to be recognized by the vehicle data streaming service 104. In some embodiments, the data stream source 102 may provide required information to establish a streaming infrastructure relationship, wherein the vehicle data streaming service 104 serves an endpoint of a data pipeline from the data stream source 102. For example, the request to register data stream source 152, may include information needed by the vehicle data streaming service 104 to access the streaming data generated by the data stream source 102, such as the names of categories used to organize messages containing the vehicle information 202. Moreover, the request to register data stream source 152 may further comprise access credentials. In some embodiments, the authorization of the registration request may include HTTP authentication using username and password sent alongside an API call, key authentication using unique keys disclosed to authorized users, using OAuth authorization framework, etc. In some embodiments, the access credentials included in the request may include a lookup on a username, username password, role, or other identity. Unauthorized requests with improper access credentials may be denied, and the requesting data stream source 102 may be notified of the denial of permissions. In some embodiments, the request to register data stream source 152 may be sent, not from the data stream source 102, but from a third entity, such as the vehicle data stream provider 200.

As described in FIG. 1, the vehicle data streaming service 104 may send the registration requirements 108 to the data stream source 102. The requirements may include source infrastructure identity such as the name or network address of the data stream source 102 that has been recognized by (or that is to be recognized by) the vehicle data streaming service 104. The registration requirements may further include required schema for the messages sent to the vehicle data streaming service 104. In some embodiments, the vehicle information 202 may comprise a heterogenous set of data structures and therefore may require the registration request to provide information to configure each schema or data structures of the data stream to conform to the message schema that may be accepted by the vehicle data streaming service 104. In some embodiments, the registration requirement 108 may require the name of the vehicle attribute for the data stream source to be associated with a provided data stream. The registration requirements 108 may further comprise necessary transformations to be applied to the vehicle information 202 having a source vehicle schema 220 to conform the vehicle information 202 to a streaming service vehicle schema 234. In some embodiments, the transformation to be applied to the vehicle information 202 sent to the vehicle data streaming service 104 may be performed by a vehicle schema engine 256 of the vehicle data streaming service 104. In some embodiments, at least a portion of the transformations applied to the streamed data from the source vehicle schema 220 to the streaming service vehicle schema 234 may be performed based on information included in the required registration information provided by the data stream source 102. In some embodiments, the data stream source 102 may determine which vehicle attribute of the vehicle attribute catalog 106 to associate its vehicle data stream with based on the vehicle attributes metadata 232. The vehicle attributes metadata 232 may comprise descriptions of the vehicle attributes included in the vehicle attribute catalog 106, such as categorization of the attribute, hierarchical organization of the attributes, etc. In some embodiments, the request to register data stream source 152 may also be a request to add a new vehicle attribute to the vehicle attribute catalog 106. The various registration interactions may occur through a registration interface 112 of the vehicle data streaming service 104. Furthermore, the request may be made using various communication protocols, including various HTTPS request, RESTful requests, and other API requests.

The data stream source 102 may send the required registration information 110 according to the registration requirements 108 to complete the registration request. In some embodiments, the registration request may require approval by the vehicle data streaming service 104. Once the registration is complete, the data stream source-destination mapping 152 may map the data stream source 102 to the associated vehicle attribute according to the registration request. The data stream source may send the streamed vehicle data conforming to the registration requirements 130 to the vehicle data streaming service 104 and/or enable the vehicle data streaming service 104 to obtain the streamed vehicle data that conforms to registration requirements 130.

Figure 3:
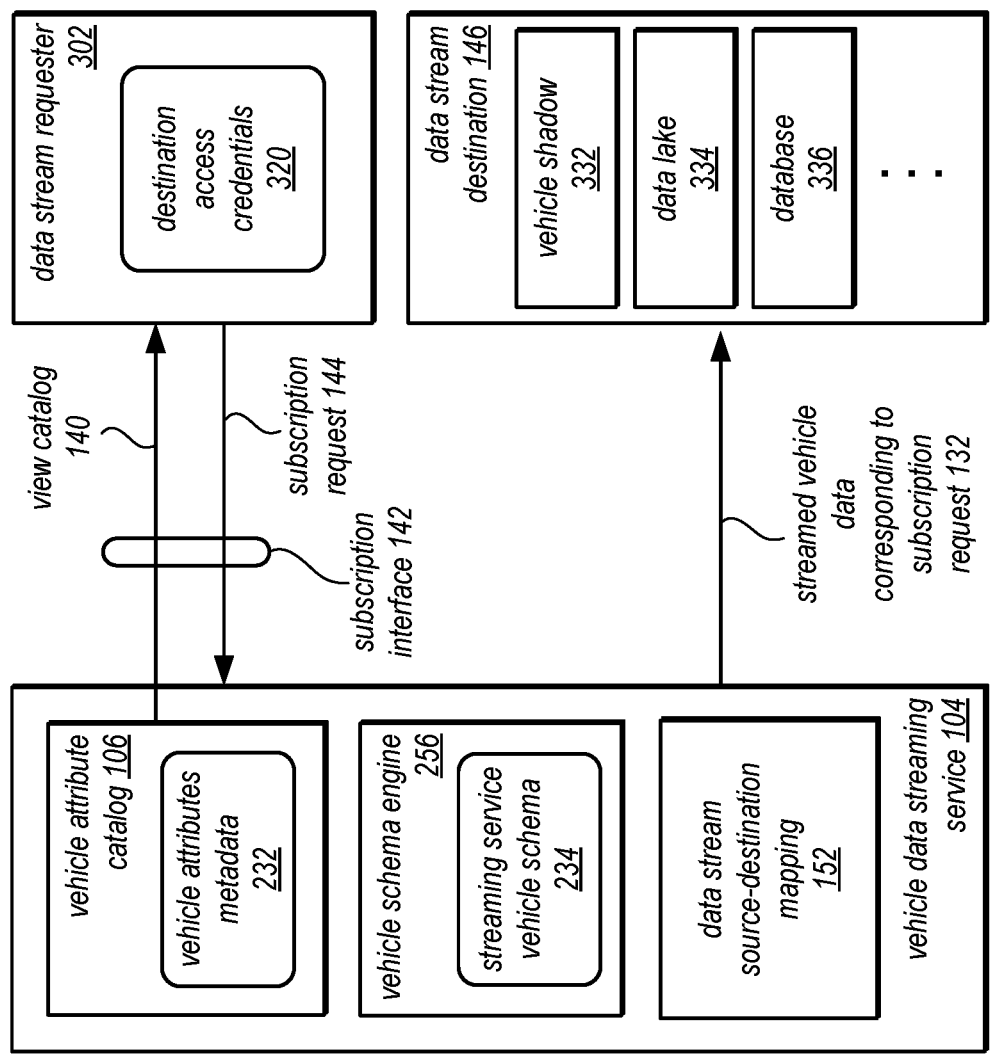
FIG. 3 illustrates a more detailed view of the vehicle data streaming service and subscription flow of the data stream to a data stream destination, including receiving the streamed vehicle data associated with a vehicle attribute and providing streamed data for a subscribed attribute to the data stream destination, according to some embodiments.

FIG. 3 illustrates a more detailed view of the vehicle data streaming service and subscription flow of the data stream destination, including receiving the streamed vehicle data associated with a vehicle attribute and providing streamed data for a subscribed attribute to a data stream destination, according to some embodiments.

In some embodiments, a data stream requester 302 may view the vehicle attribute catalog 140 to discover pertinent vehicle attributes and vehicle data that may be received at the data stream destination 146 as discussed in FIG. 1. In some embodiments, the data stream requester 302 may view the vehicle attributes metadata 232 to determine which ones of the vehicle attributes to subscribe to. As discussed in FIG. 2, the vehicle attributes metadata 232 may comprise descriptions of the vehicle attribute, categorization of the attribute, hierarchical organization of the attributes, and/or other information to allow the data stream destination 146 to discover vehicle data pertinent to its application. In some embodiments, the vehicle attribute catalog 106 may further provide a categorical navigation through the vehicle attributes arranged in a hierarchical organization or arranged in unique taxonomy to facilitate the discovery of pertinent vehicle attributes. In some embodiments, the vehicle attribute catalog may provide a full text search index to further facilitate the discovery of vehicle attributes.

The data stream requester 302 may send a subscription request 144 to the vehicle data streaming service 104 to receive streamed vehicle data associated with the vehicle attribute selected from the vehicle attribute catalog 106. In some embodiments, the subscription request 144 may provide a destination identity (such as the name or network address of data stream destination), the desired vehicle attribute(s), and/or access credentials. In some embodiments, the access credentials may be destination access credentials 320 associated with the data stream requester and/or access credentials associated with the data stream destination 146. In some embodiments, similar to the access credentials described in the registration request of FIG. 2, the destination access credentials 320 may comprise credentials required for HTTP authentication using username and password sent alongside an API call, key authentication using unique keys disclosed to authorized users, using OAuth authorization framework, or other types of credentials. In some embodiments, the access credentials of the subscription request may result in a lookup on a username, username password, role, or other identity. Unauthorized requests with improper access credentials may be denied, and the requesting data stream source 102 may be notified of the denial of permissions. In some embodiments, the subscription request 144 may be denied based on whether the destination access credentials 320 are sufficient to subscribe to vehicle attributes having certain access levels. In some embodiments, the vehicle attributes of the vehicle attribute catalog 106 may be associated with certain access levels that require different levels of access credentials (for example, to protect PII). In some embodiments, the vehicle attributes metadata 232 may further comprise access levels associated with the respective vehicle attributes. Furthermore, in some embodiments, the destination access credentials 320 may be associated with a jurisdiction that the data stream destination 146 is located in. For example, the vehicle data streaming service 104 may require subscription request 144 made from the data stream destination 146 with the destination access credentials 320 to have greater levels of access as compared to another stream destination from a different jurisdiction. The differing subscription request access credential requirements based on differing jurisdictions will be further described in FIG. 7.

Although FIG. 3 depicts a subscription request made by the data stream requester 302, other entities may send the subscription request 144 to establish a subscription for the data stream destination 146. In some embodiments, the access credentials required for the subscription request 144 to be approved may be the access credentials of the requesting entity, or access credentials provided in the request message. Moreover, although FIG. 3 depicts data stream requester 302 and data stream destination 146 as separate entities, in some embodiments, the data stream destination 146 may be the requesting entity as discussed in FIG. 1.

Figure 4A:
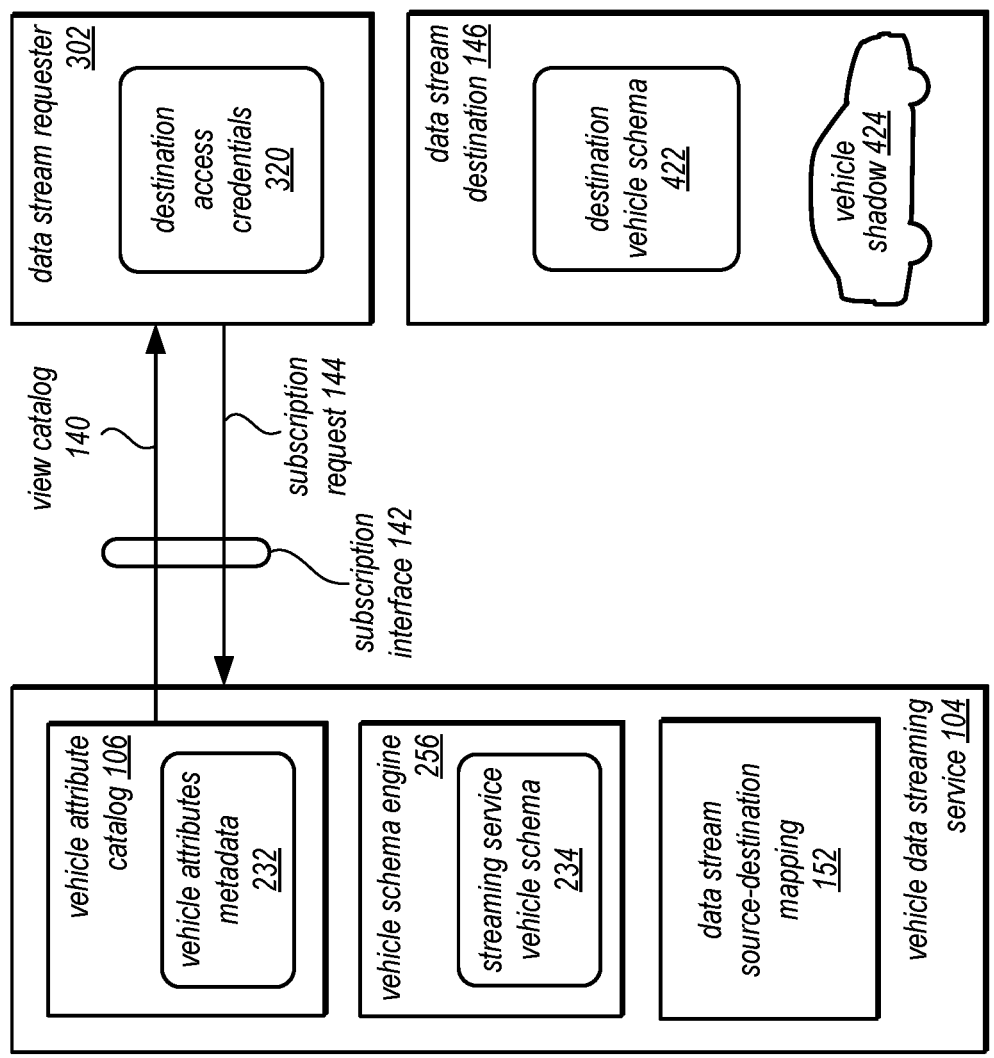
FIG. 4A illustrates a more detailed view of the vehicle data streaming service that evaluates a subscription request from a data stream requester for a data to be delivered to a destination that has a different vehicle schema than a schema used by the vehicle data streaming service, according to some embodiments.
Figure 4B:
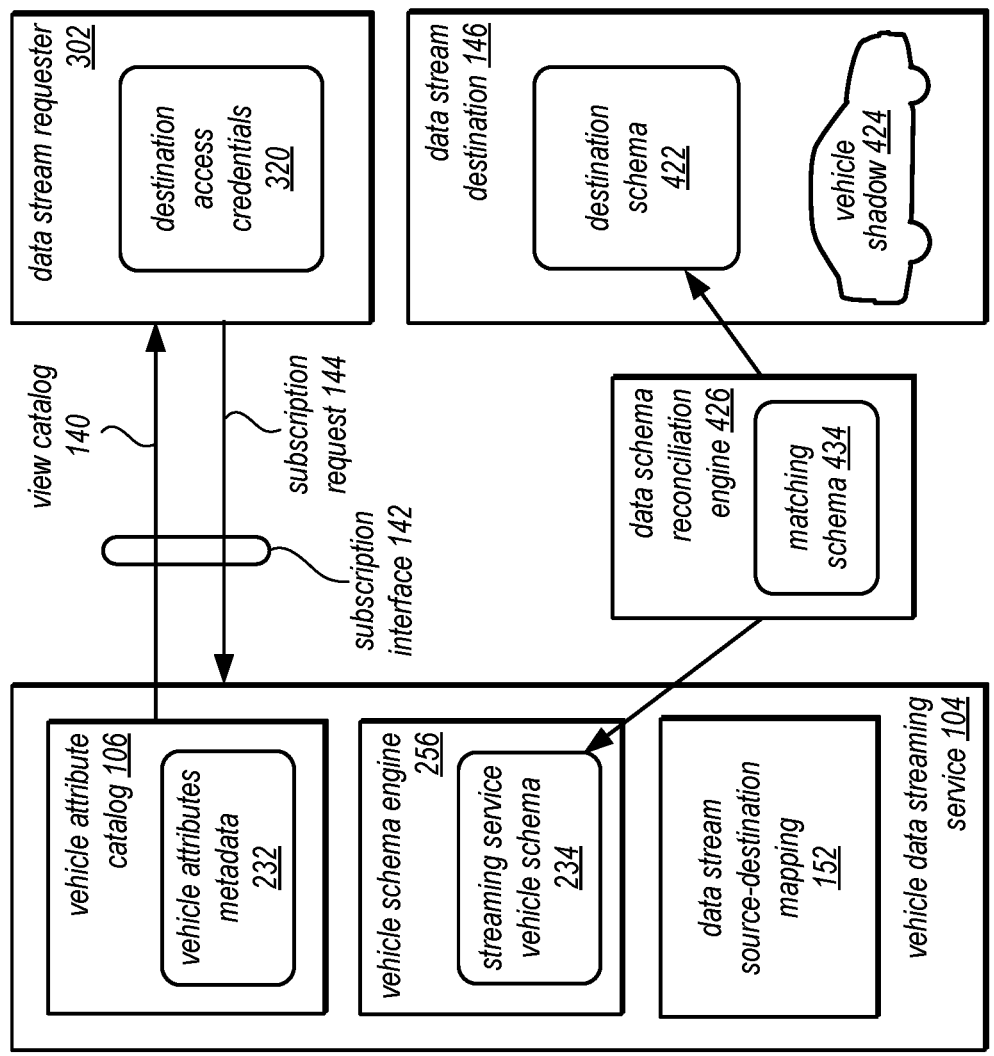
FIG. 4B illustrates a more detailed view of the vehicle data streaming service and a data schema reconciliation engine that reconciles the differing vehicle schemas between that used by the data stream destination and the schema used by the vehicle data streaming service, according to some embodiments.
Figure 4C:
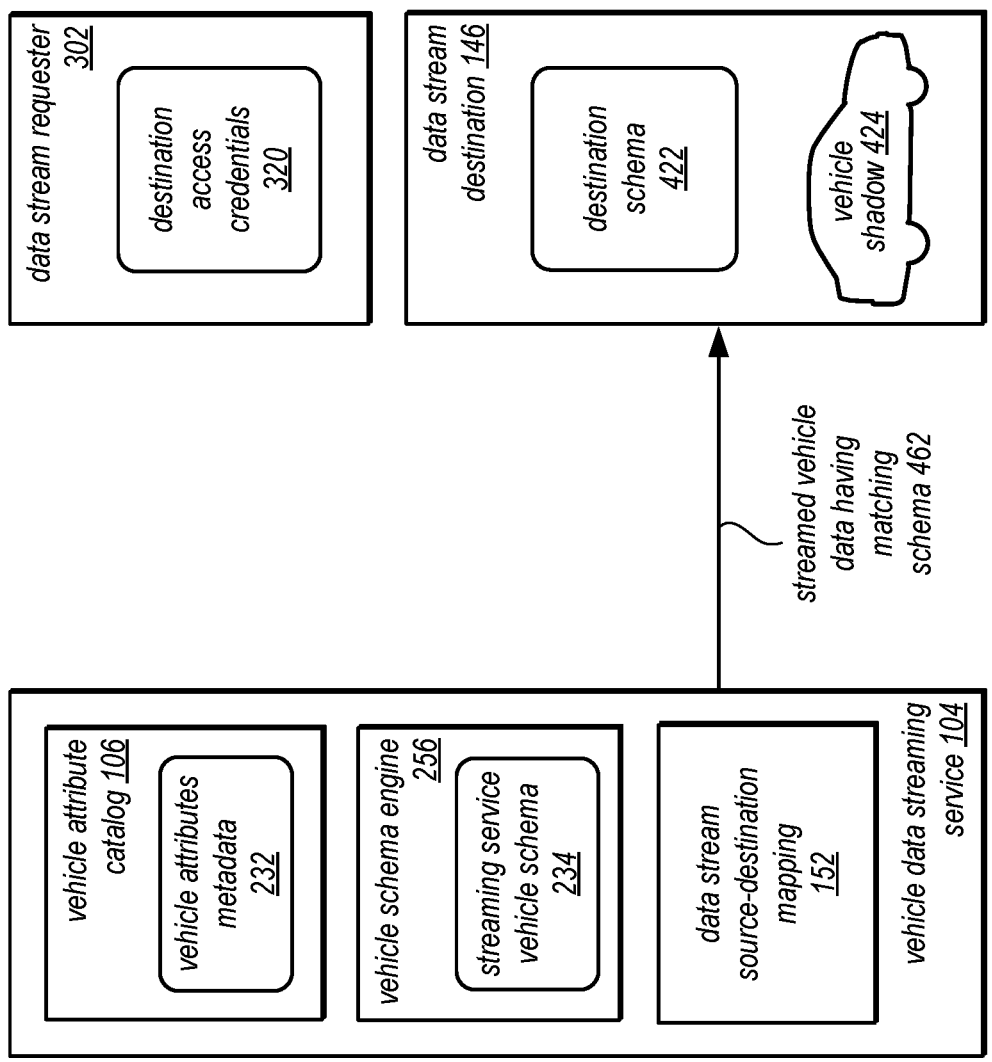
FIG. 4C illustrates a more detailed view of the vehicle data streaming service showing reconciled vehicle schemas between the data stream destination and the vehicle data streaming service, wherein streamed vehicle data is delivered to the data stream destination using a matching schema that matches the destination schema, according to some embodiments.

The vehicle data streaming service 104, upon a valid subscription request, creates a mapping between the data stream source and data stream destination 146 based on the selected vehicle attribute. The vehicle data streaming service 104 sends the streamed vehicle data corresponding to the subscription request 132. In some embodiments, the data stream destination 146 may comprise a vehicle shadow 332, a data lake 334, a database 336, or any other suitable destination. In some embodiments, streamed vehicle data 132 may conform to the schema of the data stream destination 146, or the data stream destination 146 may not require the streamed data to conform to a certain schema. However, in some embodiments, the data stream destination 146 may require the vehicle data to conform to a schema different than the streaming service vehicle schema 234. FIG. 4A-4C will describes the reconciliation between differing vehicle schemas of the vehicle data streaming service 104 and the data stream destination 146.

FIG. 4A illustrates a more detailed view of the vehicle data streaming service that implements a subscription based on a subscription request from a requester for a destination that has a different vehicle schema than the vehicle data streaming service, according to some embodiments.

In some embodiments, the data stream destination 146 may have a destination vehicle schema 422 that describes vehicle properties and the relations between the vehicle properties in accordance with an ontology used at the data stream destination. For example, the data stream destination 146 may be comprised of a vehicle shadow 424 or other vehicle virtual representation service that gives visibility to status of a connected vehicle and allows changes to the virtual vehicle shadow to be reflected in the physical vehicle. Such vehicle shadow may be associated with a distinct destination vehicle schema 422 that is different than the streaming service vehicle schema 234 of the vehicle data streaming service 104. The data stream destination 146 having the destination vehicle schema 422 may require that the streamed vehicle data be transformed to match the destination vehicle schema 422.

As described in FIG. 3, the data stream requester 302 may request to view the vehicle attribute catalog 106. In some embodiments, the vehicle attributes metadata 232 in the vehicle attribute catalog 106 may inform the data stream requester 302 that the streaming service vehicle schema for the vehicle attribute as determined in the vehicle schema engine 106 differs from the destination vehicle schema 422. In some embodiments, the data stream requester 302 may send the subscription request 144 via the subscription interface 142 and indicate the necessary transformation that the vehicle schema engine 106 should apply to the streamed data to conform to the destination vehicle schema 422.

FIG. 4B illustrates a more detailed view of the vehicle data streaming service and a data schema reconciliation engine that reconciles the differing vehicle schemas between the data stream destination and the vehicle data streaming service, according to some embodiments.

Based on the subscription request 144 as described in FIG. 4A, a data schema reconciliation engine 426 may generate a matching schema 434. The data schema reconciliation engine 426 may, in some embodiments, generate the matching schema 434 to be identical to the streaming service vehicle schema 234. In some embodiments, the data schema reconciliation engine 426 may generate the matching schema 434 to be identical to the destination vehicle schema 422 or conform to a third vehicle schema differing from either of the two schemas. The data schema reconciliation engine 426 may send the matching schema to the vehicle data streaming service 104 and data stream destination 146. In some embodiments, the data schema reconciliation engine 426 may modify the streaming service vehicle schema 234 and modify the destination vehicles schema 422 to conform to the matching schema 434. In some embodiments wherein the matching schema is identical to the streaming service vehicle schema 234, only the destination vehicle schema 422 may be changed. In another embodiment, where in the matching schema 434 is identical to the destination vehicle schema 422, only the streaming service vehicle schema 234 may be changed.

Although FIG. 4B depicts data schema reconciliation engine 426 located outside of the vehicle data streaming service 104. In some embodiments, the data schema reconciliation engine 426 may be part of the vehicle data streaming service 104. Moreover, in some embodiments, the data schema reconciliation engine 426 may communicate only the matching schema 434, and may not be involved in transforming either of the streaming service vehicle schema 234 or the destination vehicle schema 422.

FIG. 4C illustrates a more detailed view of the vehicle data streaming service with reconciled vehicle schemas between the data stream destination and the vehicle data streaming service and sends a streamed vehicle data having a matching schema, according to some embodiments.

In FIG. 4C, a streamed vehicle data having matching schema 426 is sent from the vehicle data streaming service 104 to the data stream destination 146. In some embodiments, as described in FIG. 4B, a data schema reconciliation engine may have transformed the streaming service vehicle schema 234 and/or the destination vehicle schema of 422 to have a matching schema. In some embodiments, the vehicle schema engine 106 may transform the streamed vehicle data to have a matching schema, whereas in other embodiments the data schema reconciliation engine (either inside the vehicle data streaming service 104 or outside) may transform the streaming service vehicle schema 234 associated with vehicle data of a certain vehicle attribute. As described in FIG. 3, the streaming service vehicle schema 234 and the destination vehicle schema 422 may not need any transformation and may already have a matching schema. In some embodiments, the matching schema may not be a requirement for the data stream destination.

Figure 5:
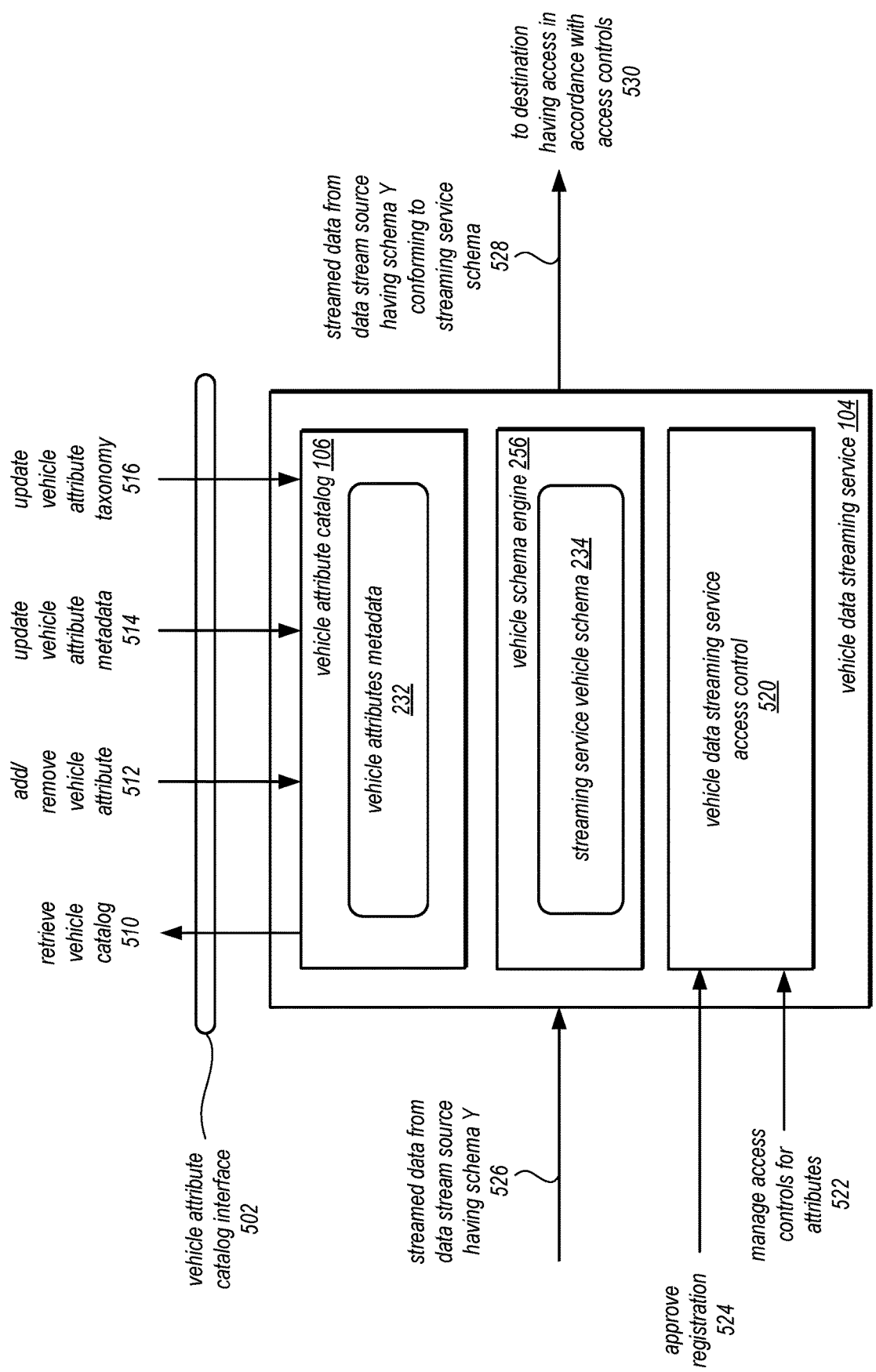
FIG. 5 illustrates a more detailed view of the vehicle data streaming service and vehicle data streaming service showing management, including vehicle attribute catalog management, according to some embodiments, according to some embodiments.

FIG. 5 illustrates a more detailed view of the vehicle data streaming service and vehicle data streaming service management, including vehicle attribute catalog management, according to some embodiments.

In some embodiments, a vehicle attribute catalog interface 504 may be used to communicate the vehicle attribute catalog 106 of the vehicle data streaming service 104. As discussed in FIGS. 1 and 2, the vehicle data streaming service 104 may allow one or more users to manage the vehicle data streaming service, including the vehicle attribute catalog 106. The metadata may comprise descriptions of the vehicle attribute, categorization of the attribute, hierarchical organization of the attributes, and other information to allow data stream destinations and other entities to discover vehicle attributes pertinent to its application. The vehicle data streaming service 104, through the vehicle attribute catalog interface 502, may allow management of the vehicle attribute catalog 106. For example, one or more authorized users may retrieve vehicle catalog 510, add/remove vehicle attribute 512, update vehicle attribute metadata 514, and update vehicle attribute taxonomy 516. In some embodiments, a change to the vehicle attribute taxonomy may further result in the vehicle schema engine 256 changing the streaming service vehicle schema 234 according to the change in the vehicle attribute taxonomy. In some embodiments, the one or more vehicle attributes of the vehicle catalog may be retrieved through a categorical navigation provided by the vehicle data streaming service 104. In some embodiments, vehicle attributes may be arranged in a hierarchical organization or arranged in unique taxonomy to facilitate the discovery of pertinent vehicle attributes and/or facilitate the navigation of the vehicle attributes. Furthermore, in some embodiments, the vehicle attribute catalog may provide a full text search index to further facilitate the discovery of vehicle attributes.

In some embodiments, the vehicle data streaming service access control 520 may allow one or more users to manage access controls for attributes 522. The vehicle data streaming service access control 520 may allow one or more users to change the type of access credentials required for registration and/or subscription requests. For example, one or more users may manage access controls for vehicle attributes 522 for the requests to require HTTP authentication using username and password sent alongside an API call, require key authentication using unique keys disclosed to authorized users, or using OAuth authorization framework. In some embodiments, the access credentials required in the request may be specified by managing the access controls for attributes 522. For example, the vehicle data streaming service access control 520 may determine a username, username password, role, or other identities that may be authorized to register stream source/destination. Moreover, in some embodiments, the response that the vehicle data stream source 104 is to take for an unauthorized request with improper access credentials may be managed through the vehicle data streaming service access control 520. For example, the vehicle data stream source 104 may be configured to respond to an unauthorized request with a notice of the denial of permissions. In some embodiments, different access credentials requirements may be determined for certain vehicle attributes. For example, vehicle attributes having greater access levels may be identified and set to require greater access privileges. Note that in some embodiments, different access privileges may be associated with different users, independent of a manner in which an identify of the users is determined based on access credentials. For example, different users that access the vehicle data streaming service using a same method of providing access credentials, for example using the various access credential mechanisms described above, may be assigned different access privileges.

In some embodiments, the streamed data from the data stream source having schema Y 526 may be received by the vehicle data streaming service 104. The vehicle data streaming service 104 may send this received data as part of a streamed data from data stream source having schema Y that conforms to the streaming service schema 528 after the vehicle schema engine 256 transforms the streamed data from schema Y to the streaming service vehicle schema 234. In some embodiments, the received streamed data 526 sent to a destination having access to the vehicle data streaming service 104 in accordance with access controls 530 based on the vehicle data streaming service access control 520.

In some embodiments, the vehicle data streaming service access control 520 may further be used to complete a registration of a given data stream source. For example, a registration request from a data stream source, such as data stream source 102 of FIG. 2, may require that the vehicle data streaming service access control 520 receive an approval of registration request 524 to complete the registration of the data stream source. In some embodiments, the approval of the registration 524 may be sent based on a determination that the registration request conforms to a schema for the selected vehicle attribute from the registration request. In some embodiments, the approval of the registration 524 may be sent based on a determination that the data stream source to be registered to is an authoritative source for the selected vehicle attribute. In some embodiments, the vehicle data streaming service access control 520 may issue the approval of the registration request and may not require receipt of any approval 524. In some embodiments, approval may be based both on the proposed data source being an authoritative source for a given attribute and that the data source provides a data stream conforming to a schema of the data streaming service.

Figure 6A:
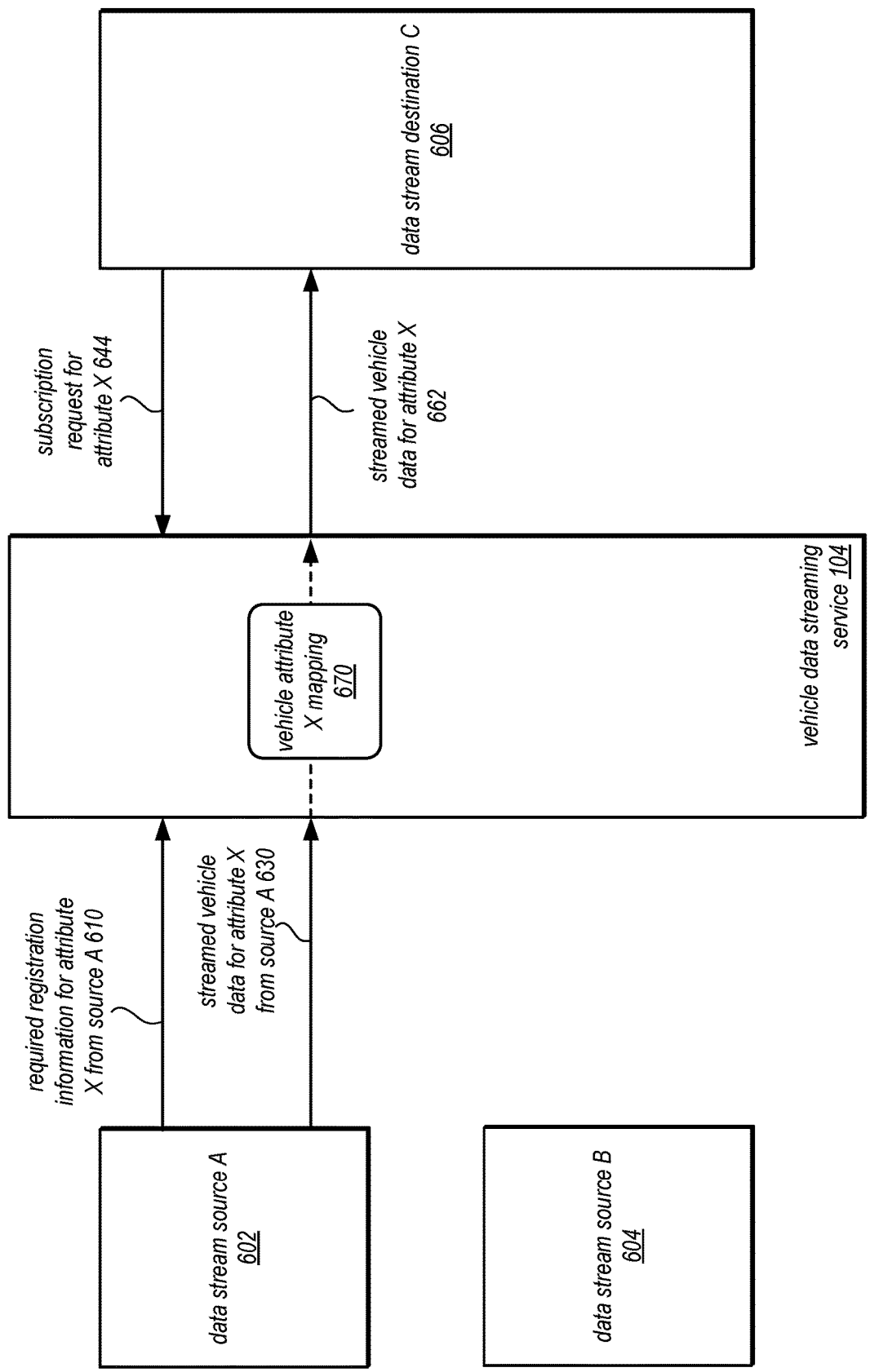
FIG. 6A illustrates a more detailed view of the data streaming service and a mapping between a first data stream source and a single data stream destination, according to some embodiments.

FIG. 6A illustrates a more detailed view of the data streaming service and a mapping between a first data stream source and a single data stream destination, according to some embodiments.

Similar to the registration process discussed in FIG. 2, a data stream source A 602 may send a required registration information for attribute X from source A 610 to be registered to vehicle attribute X and, subsequent to approval of the registration, send a streamed vehicle data for attribute X from source A 630 to the vehicle data streaming service 104. Moreover, as described in the subscription process shown in FIG. 3, a data stream destination C 606 may send a subscription request for attribute X 644. In some embodiments, based on the successful subscription request 644, the vehicle data streaming service 104 may generate a vehicle attribute X mapping 670, and send streamed vehicle data for attribute X 662 to the data stream destination C 606.

Figure 6B:
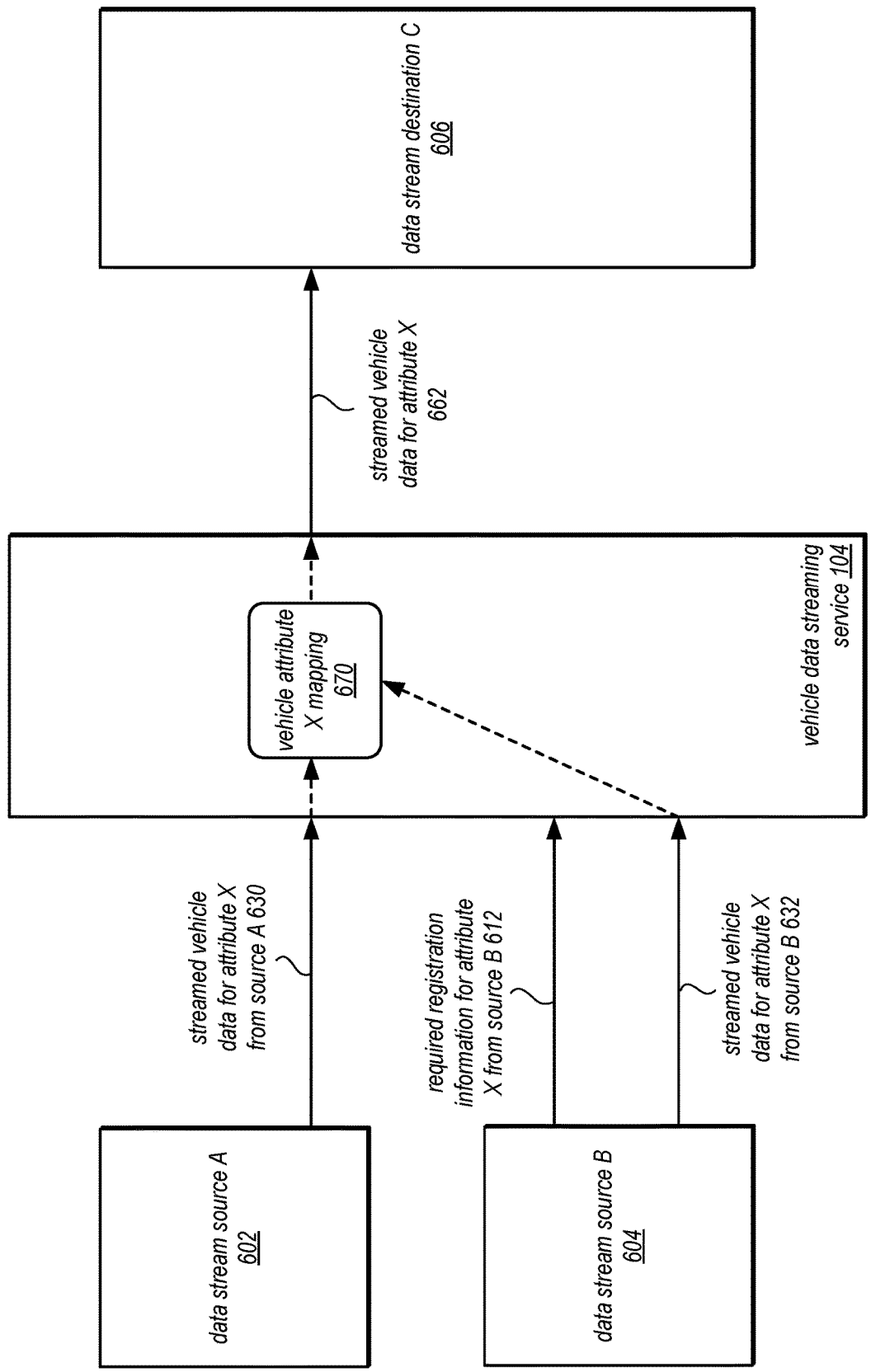
FIG. 6B illustrates a more detailed view of the data streaming service and a mapping between a second data stream source and the single data stream destination, wherein the single destination is subscribed to a vehicle attribute having multiple (alternative) sources, according to some embodiments.

FIG. 6B illustrates a more detailed view of the data streaming service and a mapping between a second data stream source to the single data stream destination subscribed to vehicle attribute having multiple sources, according to some embodiments.

Similar to the registration process discussed in FIG. 2 and FIG. 6A, a data stream source B 604 may send a required registration information for attribute X from source B 612 to be registered to vehicle attribute X, and subsequent to approval of the registration, send a streamed vehicle data for attribute X from source B 632 to the vehicle data streaming service 104. Based on the successful subscription request from FIG. 6A, the vehicle data streaming service 104 may update the vehicle attribute X mapping 670 as between all data stream sources associated with the vehicle attribute X, and send streamed vehicle data for attribute X 662 to the data stream destination C 606. The vehicle data streaming service 104 may send data received from data stream source A 602 and vehicle data stream source B 604 (vehicle data for attribute X from source A 630 and streamed vehicle data for attribute X from source B 632) respectively to the data stream destination C 606.

Figure 6C:
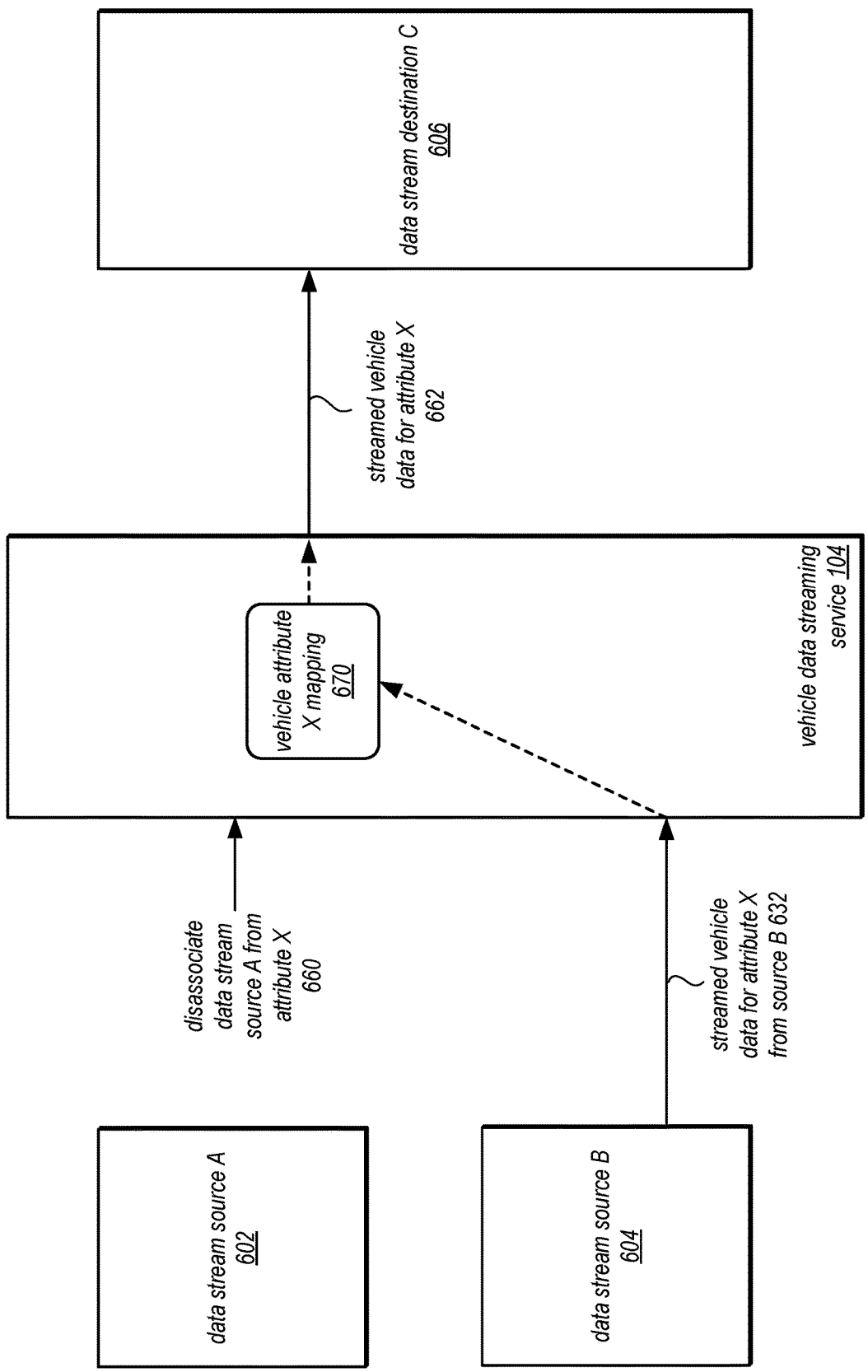
FIG. 6C illustrates a more detailed view of the data streaming service and removal of the first data stream source and maintaining the mapping between the second data stream source and the single data stream destination, according to some embodiments.

FIG. 6C illustrates a more detailed view of the data streaming service and removal of the first data stream source and maintaining the mapping between the second data stream source and the single data stream destination, according to some embodiments.

In some embodiments, the vehicle data streaming service 104 may allow one or more users to disassociate the data stream source A from attribute X 660. Upon successful disassociation, the vehicle data streaming service 104 may no longer receive vehicle information streamed from the data stream source A. However, the streamed vehicle data for attribute X from source B 632 may continue to be received by the vehicle data streaming service 104. The vehicle attribute X mapping 670 may furthermore be updated by the vehicle data streaming service 104 according to the disassociation of data stream source A 602 such that only the streamed vehicle data for attribute X from source B 632 (or other stream sources with valid registration to attribute X) would be part of the streamed vehicle data for attribute X 662 streamed to data stream destination C 606. In some embodiments, the vehicle data streaming service 104 may send one or more notifications to the data stream destination C 606 of changes made to the vehicle attribute X mapping 670. In some embodiments, data stream destination C 606 may receive a notification that the data stream source A has been disassociated from attribute X. In some embodiments, data stream destination C 606 may receive a notification that the data stream source B has been associated with attribute X. Any information pertaining to changes in the vehicle attribute mapping may be sent in the notification to the data stream destination C 606, including identity of the one or more users that have issued the registration request or the disassociation request.

Although FIGS. 6A-6C show only two data stream sources (data stream source A 602 and data stream source B 604) any number of data stream sources may be associated with a vehicle attribute. Moreover, the data stream sources may be associated with multiple vehicle attributes and not limited to a connection between one vehicle attribute to one data stream source.

Figure 7:
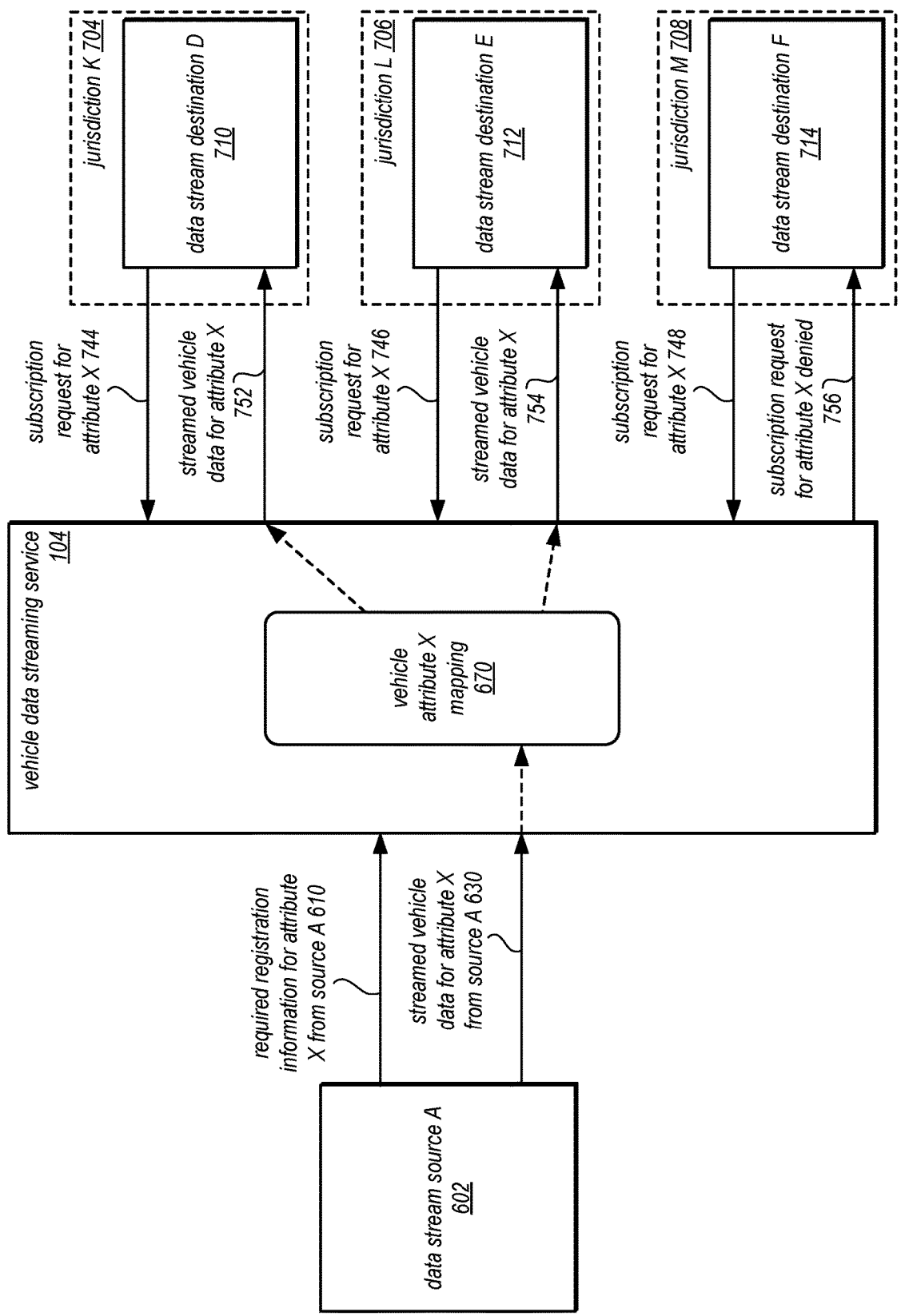
FIG. 7 illustrates a more detailed view of the data streaming service and mapping between a single data stream source and multiple data stream destinations in different jurisdictions, according to some embodiments.

FIG. 7 illustrates a more detailed view of the data streaming service and mapping between a single data stream source and multiple data stream destination in different jurisdictions, according to some embodiments.

As discussed in FIG. 2 and FIG. 6, the data stream source A 602 may send required registration information for attribute X from source A 610 to be associated with vehicle attribute X. Upon a successful registration, the data stream source A 602 may send a streamed vehicle data for attribute X from source A 630 to the vehicle data streaming service 104. In some embodiments, various data stream destinations may send subscription requests to be associated with the vehicle attribute X. In FIG. 7, data stream destination D 710, data stream destination E 712, and data stream destination F 714 associated with respective jurisdiction K 703, jurisdiction L 706, and jurisdiction M 708 may send subscription requests to the vehicle data streaming service 104. The data stream destination D 710, data stream destination E 712, data stream destination F 714, may respectively send subscription requests for attribute X 744, 746, 748 to vehicle data streaming service 104 with respective access credentials.

In some embodiments, the vehicle data streaming service 104 may approve the subscription requests for attribute X from data stream destination D 710 and data stream destination E 712 based on the resubscription requests having valid access credentials. In some embodiments, the vehicle data streaming service 104 may reject the subscription request for attribute X 748 based on the data stream destination F 714 being associated with jurisdiction M 708. As discussed in FIG. 3, the rejection may be dependent on identifying the access credentials of the vehicle subscription request 748 and denying the subscription request based on whether the destination access credentials are sufficient to subscribe to vehicle attributes having certain PII levels. In some embodiments, the data stream destination E 712, and data stream destination F 714 may have similar level of access credentials and/or privileges, but based on the differing jurisdictions, the subscription request 746 for data stream destination E 712 may be approved and the subscription request 748 for data stream destination F 714 may be denied. In some embodiments, vehicle data streaming service 104 may send the data stream destination F 714 a notification that the subscription request for attribute X has been denied 756.

In some embodiments, the vehicle attribute X mapping 670 may be generated based on the registration and subscription requests, and the vehicle data streaming service 104 may send the streamed vehicle data for attribute X from source A 630 as part of the streamed vehicle data for attribute X 752 to data stream destination D 710 and, as part of the streamed vehicle data for attribute X 754, to data stream destination E 712. Although FIG. 7 shows only three data stream destinations any number of data stream destinations may be associated with a vehicle attribute. Moreover, the data stream sources may be associated with multiple vehicle attributes and not limited to a connection between one vehicle attribute to one data stream source.

Figure 8:
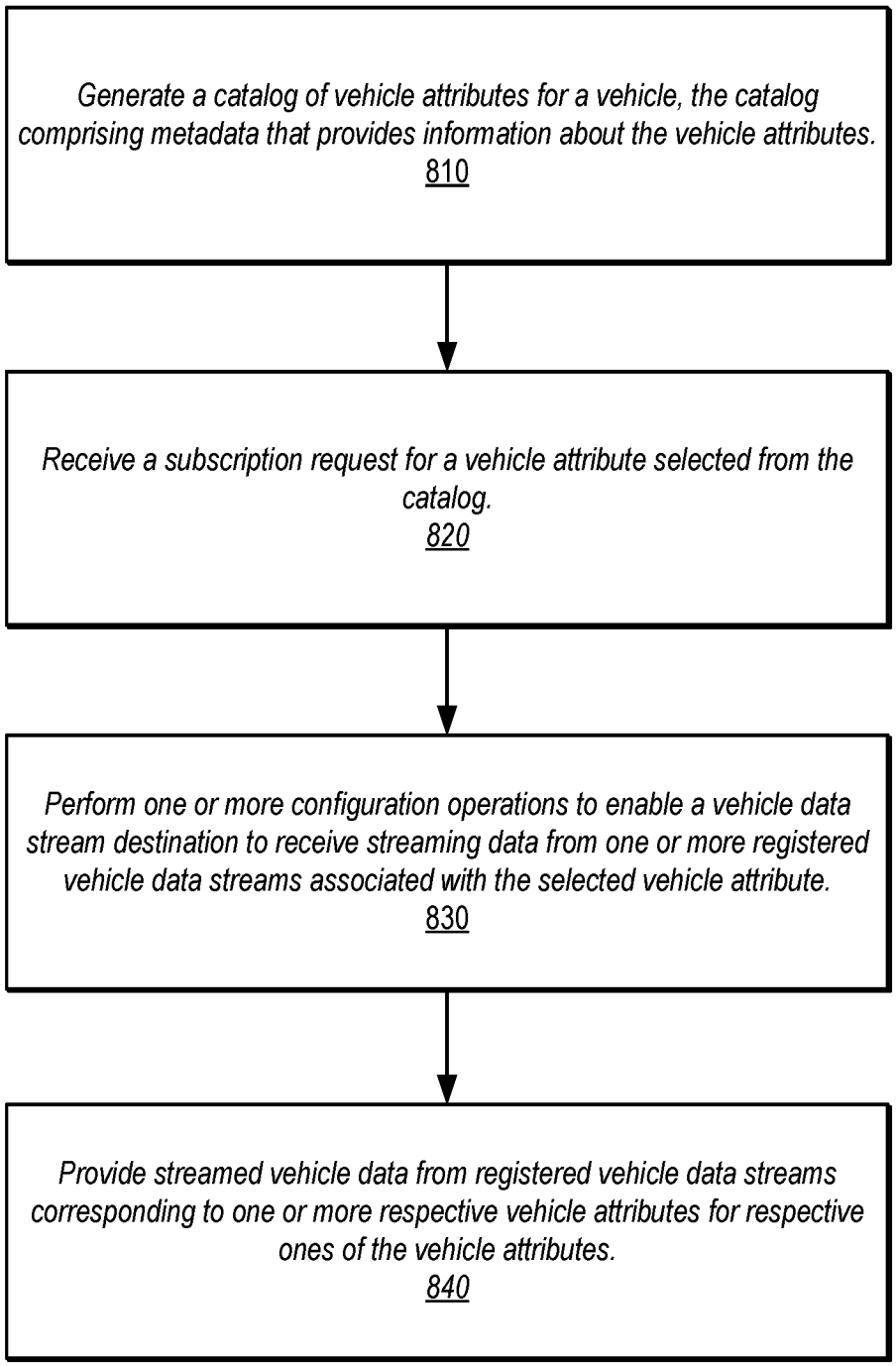
FIG. 8 illustrates a flowchart of operations performed by a vehicle data streaming service to provide a catalog of vehicle attributes, register a data stream source to a vehicle attribute, and provide streamed vehicle data based on a subscription to a selected vehicle attribute of the catalog, according to some embodiments.

FIG. 8 illustrates a flowchart of operations performed by a vehicle data streaming service to provide a catalog of vehicle attributes, register a data stream source to a vehicle attribute, and provide streamed vehicle data based on a subscription to a selected vehicle attribute of the catalog, according to some embodiments.

At block 810 a vehicle data streaming service generates a catalog of vehicle attributes for a vehicle, the catalog comprising metadata that provides information about the vehicle attributes. As discussed in FIG. 2, the metadata may comprise descriptions of the vehicle attribute, categorization of the attribute, hierarchical organization of the attributes, and other information to allow the data stream destination (e.g., a requesting entity associated with the data stream destination) to discover vehicle data pertinent to its application.

At block 820, the vehicle data streaming service receives a subscription request for a vehicle attribute selected from the catalog. As discussed in FIG. 3, in some embodiments, the subscription request may require a valid access credentials of the requesting entity or valid access credentials provided by the request message to be approved.

At block 830, the vehicle data streaming service performs one or more configuration operations to enable a vehicle data stream destination to receive streaming data from one or more registered vehicle data streams associated with the selected vehicle attribute.

At block 840, the vehicle data streaming service provides the streamed vehicle data from registered vehicle data streams corresponding to the respective vehicle attributes for respective ones of the vehicle attributes to one or more subscribed vehicle data stream destination. In some embodiments, as discussed in FIG. 7, there may be multiple subscribed vehicle data stream destination receiving the streamed vehicle data based on subscription of multiple destinations to the same vehicle attribute.

Figure 9:
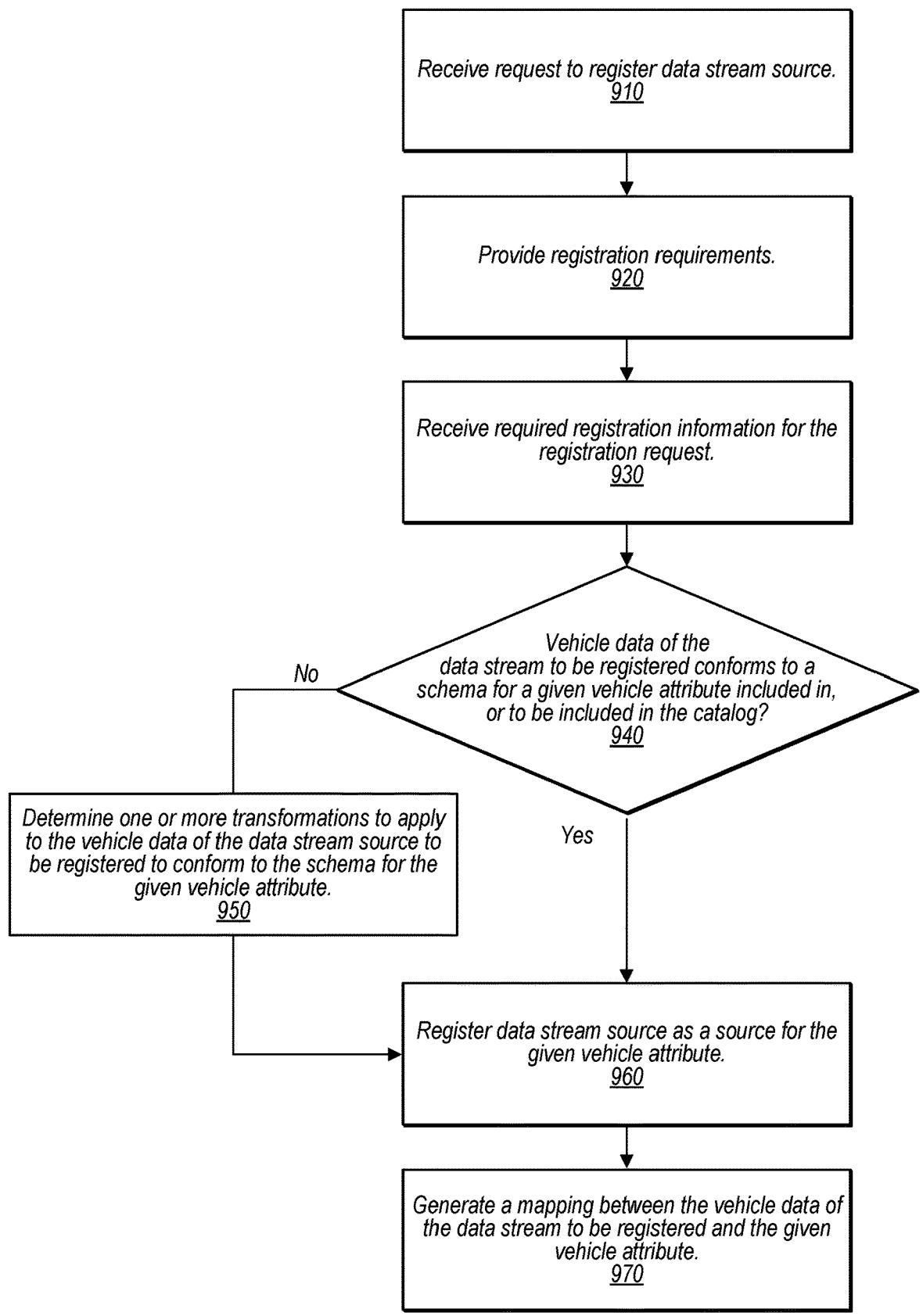
FIG. 9. illustrates a flowchart of operations to register a vehicle data stream source and associate the vehicle data stream source to a given vehicle attribute, wherein approval of the registration is determined based on the streamed vehicle data source conforming to a vehicle schema for the given vehicle attribute, according to some embodiments.

FIG. 9. illustrates a flowchart of operations to register a vehicle data stream source and associate a vehicle attribute based on the streamed vehicle data source conforming to a vehicle schema for a given vehicle attribute, according to some embodiments.

At block 910, a request to register a data stream source is received by a vehicle data streaming system. In some embodiments, the request to register the data stream source may also include a request to be recognized by the vehicle data streaming service as an acceptable data stream source as discussed in FIG. 1.

At block 920, registration requirements are provided by the vehicle data streaming system. For example, in some embodiments, the registration requirements may include source infrastructure identity information and configuration information that can be used to conform to a message schema of the vehicle data streaming system. In some embodiments, the registration requirements may be those further discussed in FIG. 2.

At block 930, required registration information for the registration request is received. In some embodiments, the registration information for the registration request may provide additional information beyond the registration requirements as described at block 920.

At block 940 a determination is made whether the vehicle data of the data stream to be registered conforms to a schema for a given vehicle attribute included in, or to be included in the catalog. In some embodiments, the determination may be performed by the data stream source after it has received the registration information containing the required vehicle schema for the data stream to be conformed to.

At block 950, if the vehicle data to be registered does not conform to the schema for a given vehicle attribute, a determination is made for one or more transformations to apply to the vehicle data of the data stream source to be registered to conform to the schema for the given vehicle attribute. As discussed in FIG. 3, the determination may be performed by the data stream source as part of providing the required registration information, and the transformation given as part of the required registration information for the registration request.

At block 960, the data stream source is registered to the given vehicle attribute. In some embodiments, the data stream may be registered to more than one vehicle attribute as further discussed in FIGS. 6A-6C.

At block 970 a vehicle data streaming service generate a mapping between the vehicle data of the data stream to be registered and the given vehicle attribute. As discussed in FIG. 6A-6C, there may be more than one vehicle data stream source associated with the selected vehicle attribute.

Figure 10:
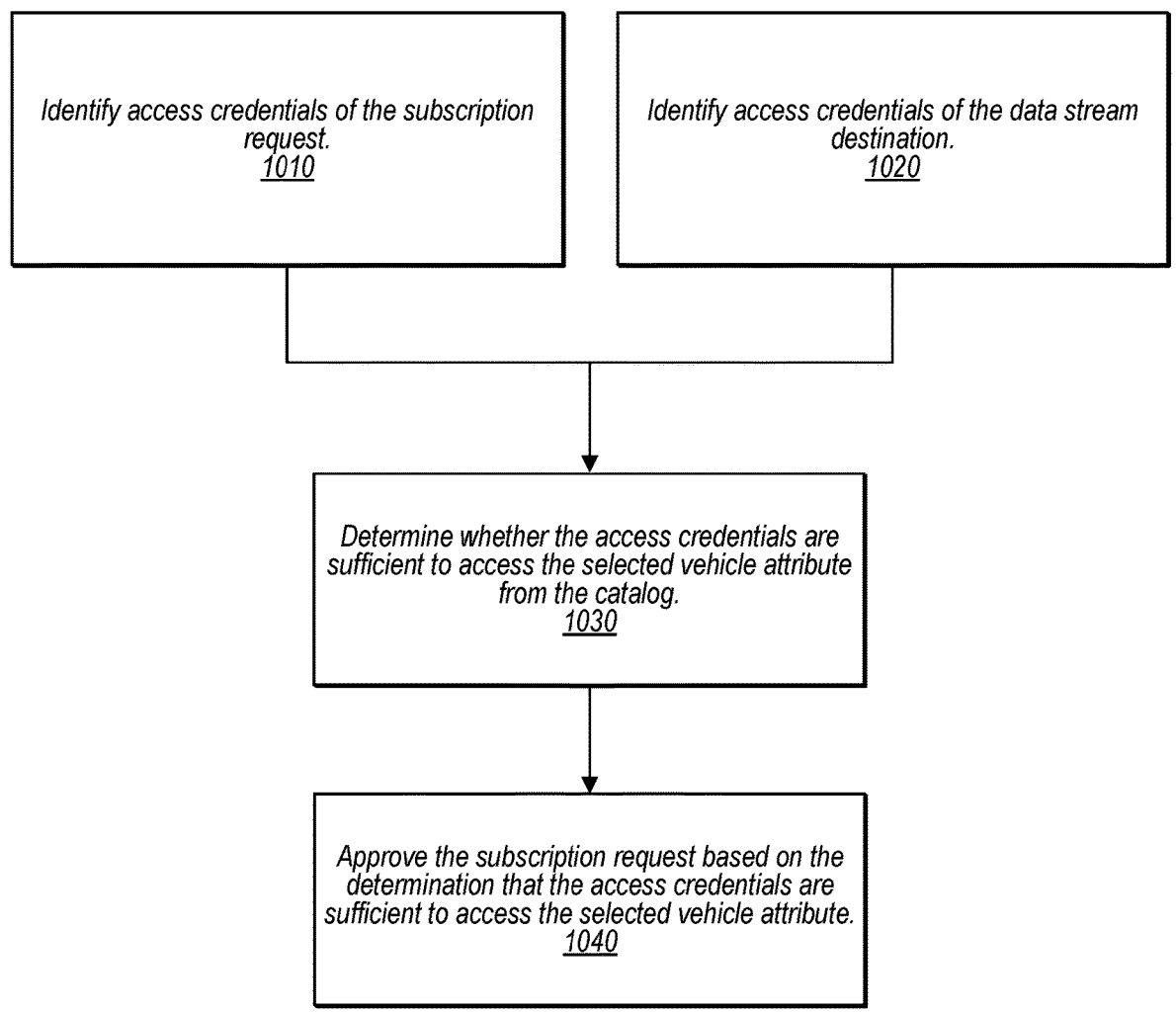
FIG. 10 illustrates a flowchart of operations performed by a vehicle data streaming service to approve subscription requests based on determining whether access credentials are sufficient for the selected vehicle attribute, according to some embodiments.

FIG. 10 illustrates a flowchart of operations performed by a vehicle data streaming service to approve subscription requests based on determining whether access credentials are sufficient for the selected vehicle attribute, according to some embodiments.

At block 1010 a vehicle data streaming service identifies access credentials of the subscription request. As discussed in FIG. 3, the access credentials may be information that fulfill HTTP authentication such as username and password sent alongside an API call, information that fulfill key authentication such unique keys disclosed to authorized users, etc.

At block 1020, the vehicle data streaming service identifies access credentials of the data stream destination. In some embodiments, the access credentials may be destination access credentials associated with the data stream destination instead of (or in addition to) access credentials of the request itself.

At block 1030, the vehicle data streaming service determines whether the access credentials are sufficient to access the selected vehicle attribute from the catalog. In some embodiments, as discussed in FIG. 7, the access credentials may be assessed based at least in part on the level of personally identifiable information of the selected vehicle attribute. Moreover, as further discussed in FIG. 7, the access requests may differ based on the jurisdiction associated with the data stream destination.

At block 1040, the vehicle data streaming service approves the subscription request based on the determination that the access credentials are sufficient to access the selected vehicle attribute.

Example Computer System

Figure 11:
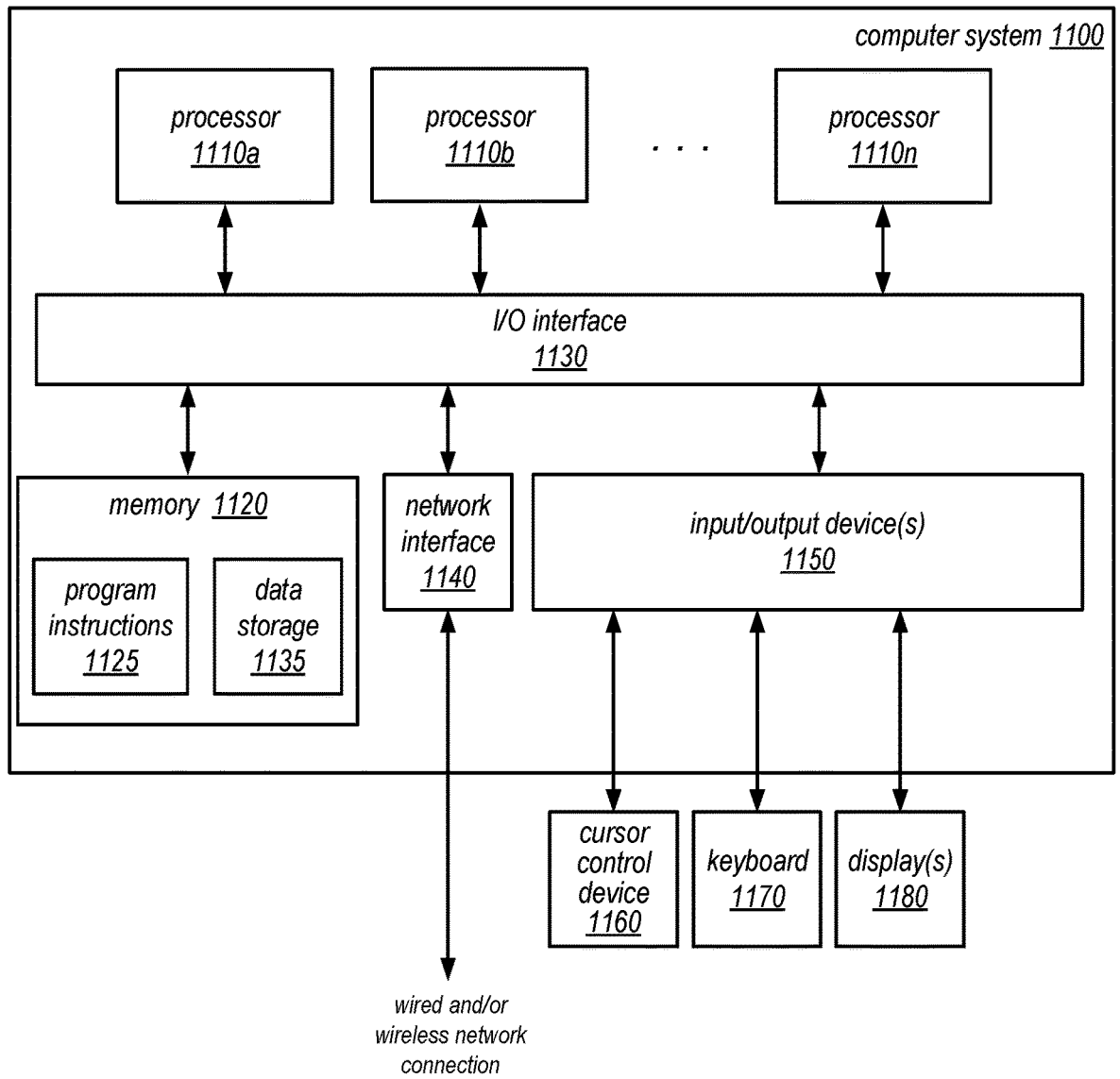
FIG. 11 illustrates a block diagram illustrating an example computer system that implements some or all of the techniques described herein, according to some embodiments.

FIG. 11 illustrates exemplary computer system 1100 usable to implement aspects of the vehicle data streaming service as described above with reference to FIGS. 1-10. In different embodiments, computer system 1100 may be any of various types of devices, including, but not limited to, a personal computer system, handheld computer, workstation, network computer, a mobile device, a consumer device, application server, storage device, a peripheral device such as a switch, modem, router, or in general any type of computing or electronic device.

Various embodiments of program instructions for providing a curated catalog of vehicle attributes, allowing a vehicle data stream source to register to the vehicle data streaming system, and allowing a vehicle data stream destination to subscribe to the vehicle attribute in the vehicle catalog, as described herein, may be executed in one or more computer systems 1100, which may interact with various other devices. Note that any component, action, or functionality described above with respect to FIGS. 1-10 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices 1150, such as cursor control device 1160, keyboard 1170, and display(s) 1180. In some cases, it is contemplated that embodiments may be implemented using a single instance of computer system 1100, while in other embodiments multiple such computer systems, or multiple nodes making up computer system 1100, may be configured to host different portions or instances program instructions as described above for various embodiments. For example, in one embodiment some elements of the program instructions may be implemented via one or more nodes of computer system 1100 that are distinct from those nodes implementing other elements.

In some embodiments, computer system 1100 may be implemented as a system on a chip (SoC). For example, in some embodiments, processors 1110, memory 1120, I/O interface 1130 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1120 may be configured to store compression or decompression program instructions 1122 and/or sensor data accessible by processor 1110. In various embodiments, system memory 1120 may be implemented using any suitable memory technology, such as static random-access memory (SRAM), synchronous dynamic RAM (SDRAM), nonvolatile/Flash-type memory, or any other type of memory. In the illustrated embodiment, program instructions 1122 may be configured to implement any of the functionality described above. In some embodiments, program instructions and/or data may be received, sent or stored upon different types of computer-accessible media or on similar media separate from system memory 1120 or computer system 1100.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1150 may, in some embodiments, include one or more display terminals, keyboards, keypads, touchpads, scanning devices, voice or optical recognition devices, or any other devices suitable for entering or accessing data by one or more computer systems 1100. Multiple input/output devices 1150 may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

As shown in FIG. 11, memory 1120 may include program instructions 1122, which may be processor-executable to implement any element or action described above. In one embodiment, the program instructions may implement the methods described above. In other embodiments, different elements and data may be included.

Computer system 1100 may also be connected to other devices that are not illustrated, or instead may operate as a stand-alone system. In addition, the functionality provided by the illustrated components may, in some embodiments, be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more computing devices configured to implement a vehicle data streaming service wherein the vehicle data streaming service is configured to:
generate a catalog of vehicle attributes for a plurality of vehicles, wherein entries in the catalog comprise metadata that provide information about the vehicle attributes, and wherein the data streaming service is configured to provide, for respective ones on the vehicle attributes, streamed vehicle data from registered vehicle data streams corresponding to the respective vehicle attributes, wherein the streamed vehicle data for a subset of the plurality of vehicles is associated with a schema which is different from another schema associated with the streamed vehicle data of another subset of the plurality of vehicles;
receive a subscription request for a vehicle attribute, wherein the vehicle attribute is selected from the catalog and the subscription request indicates a given schema;
perform, based on approval of the subscription request, one or more configuration operations to enable a vehicle data stream destination to receive streaming data from one or more of the registered vehicle data streams associated with the selected vehicle attribute according to the given schema; and
stream the streaming data to the vehicle data stream destination, wherein the streamed data has the given schema.

2. The system of claim 1, wherein the vehicle data streaming service is further configured to:
receive a registration request indicating a vehicle data stream to be registered;
determine whether vehicle data of the data stream to be registered conforms to the given schema for a given vehicle attribute included in, or to be included in the catalog, and in response to determining that the vehicle data does not confirm to the given schema, determine one or more transformations to apply to the vehicle data of the data stream source to be registered to conform to the given schema for the given vehicle attribute; and
generate a mapping between the vehicle data of the data stream to be registered and the given vehicle attribute upon an approval of the registration request based at least in part on the determination that the vehicle conforms to the given schema or the determination of the one or more transformations to apply to the vehicle data.

3. The system of claim 2, wherein the approval of the registration request is further based on a determination that the data stream source to be registered is an authoritative source for the given vehicle attribute.

4. The system of claim 1, further comprising a provider network, wherein the provider network is configured to provide a plurality of service to clients of the provider network, wherein at least one of the services is a vehicle data streaming service implemented using the vehicle data streaming service.

5. The system of claim 4, wherein:
at least another one of the plurality of services provided by the provider network is configured to perform pre-processing operations on streamed vehicle data included in one or more of the registered vehicle data streams; or
the vehicle data stream destination is an additional one of the plurality of services provided by the provider network, comprising:
a data analytics service;
a data lake; or
other data storage services.

6. A method, comprising:
generating a catalog of vehicle attributes for a plurality of vehicles, wherein entries in the catalog comprise metadata that provide information about the vehicle attributes, and wherein a data streaming service is configured to provide, for respective ones on the vehicle attributes, streamed vehicle data from registered vehicle data streams corresponding to the respective vehicle attributes, wherein the streamed vehicle data for a subset of the plurality of vehicles is associated with a schema which is different from another schema associated with the streamed vehicle data of another subset of the plurality of vehicles;
receiving a subscription request for a vehicle attribute, wherein the vehicle attribute is selected from the catalog and the subscription request indicates a given schema;
performing, based on approval of the subscription request, one or more configuration operations to enable a vehicle data stream destination to receive streaming data from one or more of the registered vehicle data streams associated with the selected vehicle attribute according to the given schema; and
streaming the streaming data to the vehicle data stream destination, wherein the streamed data has the given schema.

7. The method of claim 6 further comprising:
receiving a registration request indicating a vehicle data stream to be registered;
determining that vehicle data of the data stream to be registered conforms to the given schema for a given vehicle attribute included in, or to be included in the catalog, and in response to determining that the vehicle data does not confirm to the given schema, determining one or more transformations to apply to the vehicle data of the data stream source to be registered to conform to the given schema for the given vehicle attribute; and
generating a mapping between the vehicle data of the data stream to be registered and the given vehicle attribute upon an approval of the registration request based at least in part on the determination that the vehicle conforms to the schema or the determination of the one or more transformations to apply to the vehicle data.

8. The method of claim 7, further comprising:
receiving a new registration request indicating a new vehicle data stream to be registered;
determining that new vehicle data of the new data stream to be registered conforms to the given schema for the given vehicle attribute, and in response to determining that the new vehicle data does not confirm to the given schema, determining another one or more transformations to apply to the vehicle data of the new data stream source to be registered to conform to the given schema for the given vehicle attribute; and
generating an additional mapping between the new vehicle data of the new data stream to be registered and the given vehicle attribute; and
performing, based on the previous approval of the subscription request, another one or more configuration operations to enable the vehicle data stream destination to receive additional streaming data from the new vehicle data stream.

9. The method of claim 7, further comprising:
receiving a remove registration request indicating the vehicle data stream to remove registration;
removing, based on the remove registration request, the mapping between the new vehicle data of the data stream that was registered and the given vehicle attribute; and
performing removal configuration operations to disable the vehicle data stream destination from receiving streaming data from the vehicle data stream.

10. The method of claim 7, further comprising:
sending to the vehicle data stream destination, using the data streaming service, one or more notifications of changes to the mapping between the vehicle data of the data stream and the given vehicle attribute.

11. The method of claim 6 further comprising:
receiving a registration request indicating a vehicle data stream to be registered;
determining a data stream source for the data stream to be registered is an authoritative source for a given vehicle attribute that is to be associated with the vehicle data stream to be registered; and
generating a mapping between vehicle data of the vehicle data stream to be registered and the given vehicle attribute upon an approval of the registration request based at least in part on said determining that the data stream source associated with the data stream to be registered is an authoritative source for the given vehicle attribute.

12. The method of claim 6, further comprising:
updating, using the data streaming service, the metadata about the vehicle attributes wherein the updating comprises modifying an arrangement of the vehicle attributes taxonomy to a different configuration, or updating the given schema for a given vehicle attribute included in the catalog.

13. The method of claim 6, further comprising:
receiving a new subscription request for the vehicle attribute; and
performing, based on approval of the new subscription request, one or more configuration operations to enable a new vehicle data stream destination to receive the streaming data from the one or more of the registered vehicle data streams associated with the selected vehicle attribute.

14. The method of claim 6, wherein the approval of the subscription comprises:
identifying access credentials of the subscription request;
determining whether the access credentials are sufficient to access the selected vehicle attribute from the catalog, based at least in part on level of personally identifiable information of the selected vehicle attribute; and approving the subscription request based on the determination that the access credentials are sufficient to access the selected vehicle attribute.

15. The method of claim 6, wherein the approval of the subscription comprises:
   identifying access credentials of the vehicle data stream destination;
   determining whether the access credentials are sufficient to access the selected vehicle attribute from the catalog, based at least in part on level of personally identifiable information of the selected vehicle attribute; and
   approving the subscription request based on the determination that the access credentials are sufficient to access the selected vehicle attribute.

16. The method of claim 15, wherein a level of access credentials required to access the selected vehicle attribute differs based on a jurisdiction of the vehicle data stream destination.

17. The method of claim 6, further comprising:
   receiving a new subscription request for a plurality of selected vehicle attributes selected from the catalog;
   identifying access credentials based on the new subscription request;
   determining whether the access credentials are sufficient to access respective ones of the plurality of selected vehicle attributes from the catalog;
   approving the subscription request based on the determination that the access credentials are sufficient to access at least one of the plurality of selected vehicle attribute; and
   performing, based on approval of the new subscription request, one or more configuration operations to enable a new vehicle data stream destination to receive one or more streaming data of the selected vehicle attributes that the access credentials are sufficient to access.

18. The method of claim 6, wherein the vehicle data stream destination is a vehicle virtual representation service, wherein the method further comprises:
   tracking, via the vehicle virtual representation service, state of a vehicle connected to the provider network based on the received streaming data; and
   propagating, via the vehicle virtual representation service, changes made to the state of the vehicle from the received streaming data to the vehicle.

19. The method of claim 6, wherein the one or more configuration operations comprise:
   generating a matching schema based on a first schema for a given vehicle attribute and a second schema for the destination;
   configuring the vehicle data stream destination to accept the matching schema; and
   applying the matching schema to the streaming data.

20. One or more non-transitory, computer-readable storage media, storing program instructions that when executed on or across one or more processors cause the one or more processors to implement a vehicle data streaming service that implements:
   generating a catalog of vehicle attributes for a plurality of vehicles, wherein entries in the catalog comprise metadata that provide information about the vehicle attributes, and wherein a data streaming service is configured to provide, for respective ones on the vehicle attributes, streamed vehicle data from registered vehicle data streams corresponding to the respective vehicle attributes, wherein the streamed vehicle data for a subset of the plurality of vehicles is associated with a schema which is different from another schema associated with the streamed vehicle data of another subset of the plurality of vehicles;
   receiving a subscription request for a vehicle attribute, wherein the vehicle attribute is selected from the catalog and the subscription request indicates a given schema;
   performing, based on approval of the subscription request, one or more configuration operations to enable a vehicle data stream destination to receive streaming data from one or more of the registered vehicle data streams associated with the selected vehicle attribute according to the given schema; and
   streaming the streaming data to the vehicle data stream destination, wherein the streamed data has the given schema.

* * * * *